United States Patent
Miyagi

(10) Patent No.: US 8,243,330 B2
(45) Date of Patent: Aug. 14, 2012

(54) APPARATUS, METHOD, AND COMPUTER-READABLE RECORDING MEDIUM FOR PERFORMING COLOR MATERIAL SAVING PROCESS

(75) Inventor: Noriko Miyagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 584 days.

(21) Appl. No.: 12/370,671

(22) Filed: Feb. 13, 2009

(65) Prior Publication Data

US 2009/0213429 A1   Aug. 27, 2009

(30) Foreign Application Priority Data

Feb. 22, 2008   (JP) ................... 2008-040810

(51) Int. Cl.
  *G06F 15/00* (2006.01)
  *G06K 1/00* (2006.01)
(52) U.S. Cl. .......................... 358/1.9; 358/2.1
(58) Field of Classification Search .............. None
  See application file for complete search history.

(56) References Cited

U.S. PATENT DOCUMENTS

| | | | | |
|---|---|---|---|---|
| 5,739,828 | A * | 4/1998 | Moriyama et al. | 347/9 |
| 6,804,395 | B1 * | 10/2004 | Yoshida | 382/176 |
| 7,327,874 | B2 | 2/2008 | Shibaki et al. | |
| 7,356,160 | B2 | 4/2008 | Shibaki et al. | |
| 7,403,310 | B2 | 7/2008 | Miyagi et al. | |
| 2001/0024522 | A1 * | 9/2001 | Nakao | 382/232 |
| 2003/0058465 | A1 | 3/2003 | Miyagi et al. | |
| 2004/0057614 | A1 * | 3/2004 | Ogatsu et al. | 382/162 |
| 2004/0165081 | A1 | 8/2004 | Shibaki et al. | |
| 2004/0252316 | A1 | 12/2004 | Miyagi et al. | |
| 2004/0257622 | A1 | 12/2004 | Shibaki et al. | |
| 2005/0018258 | A1 | 1/2005 | Miyagi et al. | |
| 2005/0018903 | A1 | 1/2005 | Miyagi et al. | |
| 2005/0207661 | A1 | 9/2005 | Miyagi et al. | |
| 2006/0187246 | A1 | 8/2006 | Miyagi | |
| 2006/0256123 | A1 | 11/2006 | Miyagi | |
| 2006/0274332 | A1 | 12/2006 | Miyagi | |
| 2007/0127815 | A1 * | 6/2007 | Karidi et al. | 382/176 |
| 2007/0206228 | A1 | 9/2007 | Miyagi | |
| 2008/0144975 | A1 | 6/2008 | Shibaki et al. | |

FOREIGN PATENT DOCUMENTS

| | | |
|---|---|---|
| JP | 01-133470 | 5/1989 |
| JP | 04-021265 | 1/1992 |
| JP | 04-096571 | 3/1992 |
| JP | 07-298074 | 11/1995 |
| JP | 11-151833 | 6/1999 |
| JP | 2005-234391 | 9/2005 |

* cited by examiner

*Primary Examiner* — Marivelisse Santiago Cordero
*Assistant Examiner* — John Wallace
(74) *Attorney, Agent, or Firm* — IPUSA, PLLC

(57) ABSTRACT

An apparatus includes an obtaining part for obtaining image data of a document and a processing part for performing a color material saving process on the image data. The image data includes an edge part and a non-edge part. The apparatus includes a determining part configured to determine whether the document includes a low line-screen ruling area. When the document is determined not to include the low line-screen ruling area, the processing part is configured to perform a first process so that an amount of color material reduced for forming the non-edge part is greater than an amount of color material reduced for forming the edge part. When the document is determined to include the low line-screen ruling area, the processing part is configured to perform a second process so that the amounts of color material reduced for forming the edge part and the non-edge parts are uniform.

11 Claims, 33 Drawing Sheets

FIG.5

FOR EXAMPLE, AN AVERAGE DCT COEFFICIENT OF 3 BLOCKS IS EXPRESSED AS FOLLOWS:

$F00 = (A00+B00+C00)/3$ $F01 = (A01+B01+C01)/3$ $F02 = (A02+B02+C02)/3$ $\vdots$ $F77 = (A77+B77+C77)/3$

| P00 | P01 | P02 |
|-----|-----|-----|
| P10 | P11 | P12 |
| P20 | P21 | P22 |

IN A CASE WHERE:
  P11>P00&P11>P01

&P11>P02&P11>P10

&P11>P12&P11>P20

&P11>P21&P11>P22

M=max (2×P11−P00−P22,

2×P11−P01−P21,

2×P11−P02−P20,

2×P11−P10−P12)

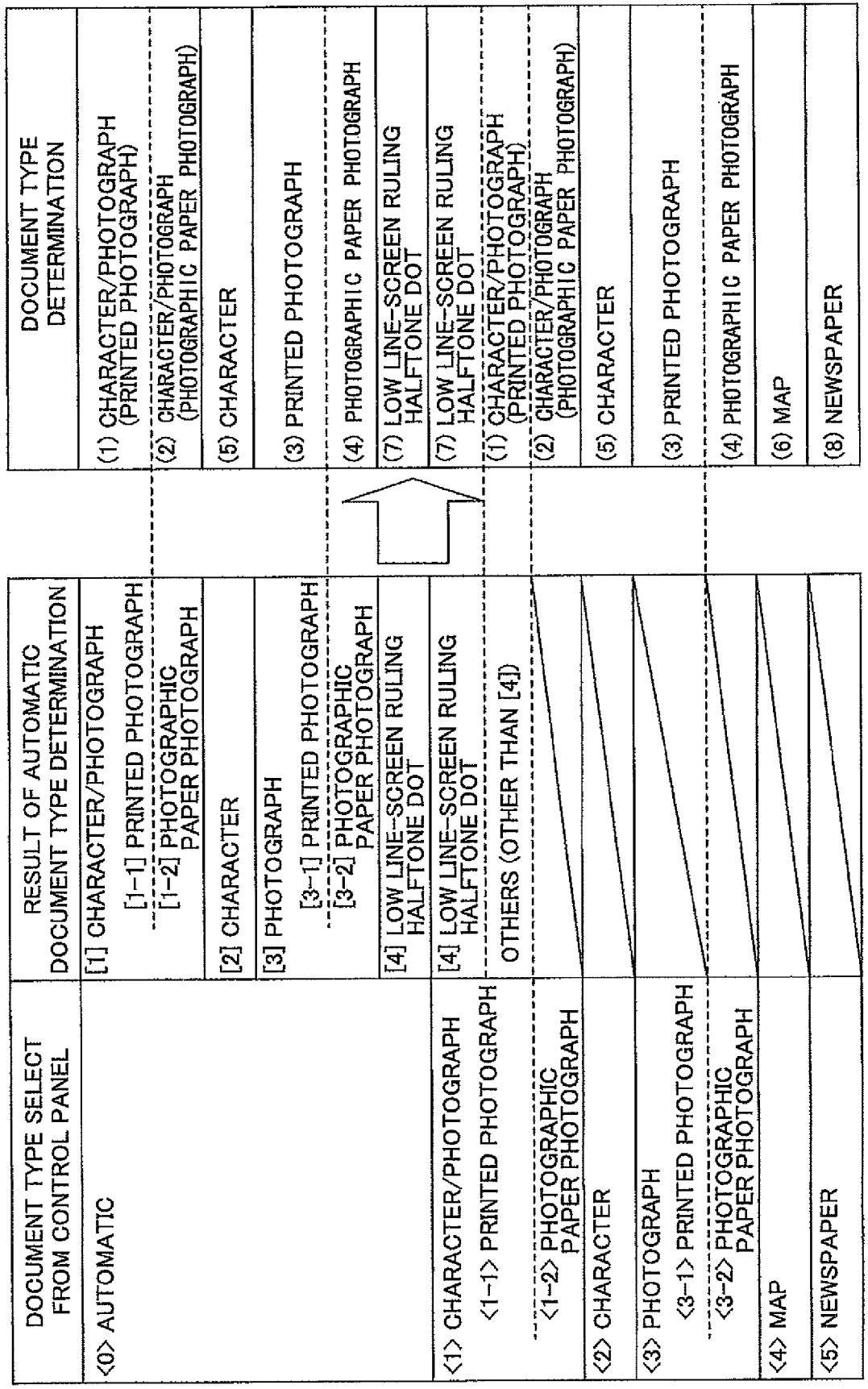

FIG.9

| DOCUMENT TYPE | SCANNER COLOR CORRECTING PART 12 | FILTER 13 | BLACK PROCESSING PART 15 | COLOR SAVING PROCESS PART 16 | PSEUDO HALFTONE PROCSS PART 18, PRINTER γ CORRECTING PART 17 |
|---|---|---|---|---|---|
| (1) CHARACTER/PHOTOGRAPH (PRINTED PHOTOGRAPH) | FOR PRINTING | ACCORDING TO SEPARATION 1 | ACCORDING TO SEPARATION | ACCORDING TO EDGE DETECTION | ACCORDING TO SEPARATION |
| (2) CHARACTER/PHOTOGRAPH (PHOTOGRAPHIC PAPER PHOTOGRAPH) | FOR PHOTOGRAPHIC PAPER | ACCORDING TO SEPARATION 2 | ACCORDING TO SEPARATION | ACCORDING TO EDGE DETECTION | ACCORDING TO SEPARATION |
| (3) PRINTED PHOTOGRAPH | FOR PRINTING | FOR HALFTONE DOT MOIRE PREVENTION | FOR COLOR CHARACTER/ PHOTOGRAPH | FOR NON-EDGE | FOR PHOTOGRAPH |
| (4) PHOTOGRAPHIC PAPER PHOTOGRAPH | FOR PHOTOGRAPHIC PAPER | FOR NOISE REMOVAL | FOR COLOR CHARACTER/ PHOTOGRAPH | FOR NON-EDGE | FOR PHOTOGRAPH |
| (5) CHARACTER | FOR PRINTING | ACCORDING TO SEPARATION 3 | FOR BLACK CHARACTER | FOR CHARACTER | FOR CHARACTER |
| (6) MAP | FOR PRINTING | ACCORDING TO SEPARATION 4 | FOR BLACK CHARACTER | ACCORDING TO EDGE DETECTION | FOR CHARACTER |
| (7) LOW LINE-SCREEN RULING HALFTONE DOT | FOR PRINTING | FOR LOW LINE-SCREEN RULING | FOR BLACK CHARACTER | FOR CHARACTER | FOR CHARACTER |
| (8) NEWSPAPER | FOR PRINTING | FOR LOW LINE-SCREEN RULING | FOR BLACK CHARACTER | FOR CHARACTER | FOR CHARACTER |

●: BLACK PIXEL
OTHERS: IGNORE
CENTER: TARGET PIXEL

○: WHITE PIXEL
OTHERS: IGNORE
CENTER: TARGET PIXEL

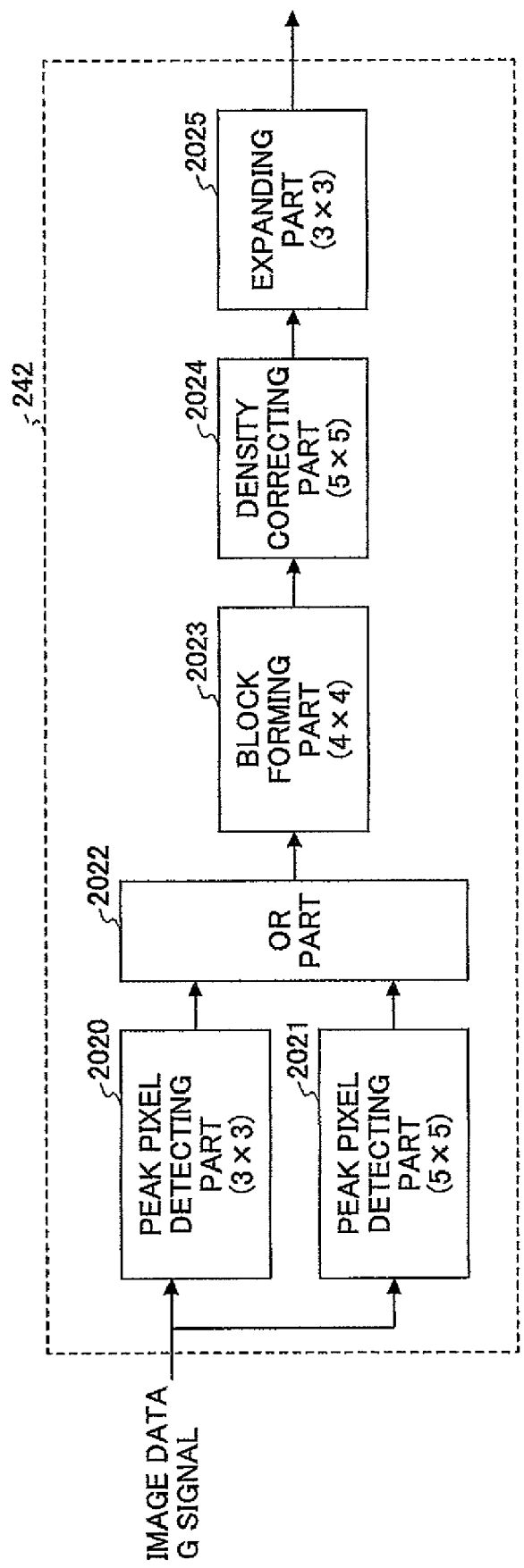

| m1 | m2 | m3 |
| --- | --- | --- |
| m4 | m0 | m5 |
| m6 | m7 | m8 |

| m1 | m2 | m3 | m4 | m5 |
| --- | --- | --- | --- | --- |
| m6 | m7 | m8 | m9 | m10 |
| m11 | m12 | m0 | m13 | m14 |
| m15 | m16 | m17 | m18 | m19 |
| m20 | m21 | m22 | m23 | m24 |

| -1 | 0 | 0 | 0 | -1 |
|----|---|---|---|----|
| 0  | 0 | 0 | 0 | 0  |
| 0  | 0 | 4 | 0 | 0  |
| 0  | 0 | 0 | 0 | 0  |
| -1 | 0 | 0 | 0 | -1 |

APPARATUS, METHOD, AND COMPUTER-READABLE RECORDING MEDIUM FOR PERFORMING COLOR MATERIAL SAVING PROCESS

BACKGROUND OF THE INVENTION

1. Field of the Invention

The present invention relates to an apparatus, a method, and a computer-readable recording medium for performing a color material saving process.

2. Description of the Related Art

In image forming apparatuses that form images using color material such as toner or ink, there is known an image forming apparatus having not only a normal outputting mode for outputting images using a normal amount of color material but also a color material saving mode for outputting images using a reduced amount of color material. As for color material saving methods used in the color material saving mode, there are, for example, a method of converting the data of each pixel to low density pixels or a method of skipping pixels (pixel skipping). However, since the images output by using these methods have their density reduced, image quality is degraded. In a case of forming character images (text images), the characters (text) may be hardly legible depending on the degree of the degradation of image quality.

In order to prevent this problem of illegible characters, there is a color material saving process where an edge part(s) of a character image is detected and a lesser amount of color material is saved for forming the edge part than that for forming a non-edge part of the character image. By using this process, the edge part of the character image can be emphasized to reduce the illegibility of the character image. However, because this color material saving process detects not only the edges of a character image but also sharp edges of a photograph image, a lesser amount of color material is saved for forming the edge part than that for forming a non-edge part of the photograph image. Therefore, in a case where the color material saving process is performed on an image having a character image and a photograph image mixed together, image quality is degraded due to undesired emphasis at the edge parts of a plotting target.

Japanese Laid-Open Patent Publication No. 11-151833 discloses a printer configured to recognize a character area and a photograph area of an original image received from a computer or the like and apply different color material saving processes to the character area and the photograph area. With this configuration, a color material saving process that emphasizes the edge parts can be applied to the character area of the original image for improving legibility while another color material saving process that uses an evenly reduced amount of color material can be applied to the photograph area of the original image for preventing image degradation due to undesired emphasis of the edge parts. Although this configuration can appropriately and speedily recognize a character area and a photograph area of an original image in a case where the data of the original image contain plotting commands such as Page Description Language (PDL), this configuration cannot recognize the character area and the photograph area in a case where the data of the original data contain only image data (e.g., bit map image data).

Japanese Laid-Open Patent Publication No. 2005-234391 discloses a copier configured to recognize a character area and a photograph area of an original image containing only image data. This configuration obtains information from the original image containing only image data by scanning a document on which the original image is formed and analyzes image features of the original image. Based on a result of the analysis, the character area and the photograph area of the original image can be recognized. Accordingly, a color material saving process for emphasizing edge parts can be applied to the character area while another color material saving process for evenly using a reduced amount of color material can be applied to the photograph area.

However, Japanese Laid-Open Patent Publication No. 2005-234391 does not specifically disclose a method of how to recognize a character area and a photograph area of an original image according to the result of analyzing image features of the original image. Even by combining other related technologies, it is difficult to precisely recognize a character area and a photograph area of an original image containing only image data. It is particularly difficult for recognizing the character area and the photograph area in a case where a photograph image is formed in the background of a character image. In this case, such a mixed area having the photograph image in the background of the character image is likely to be erroneously recognized as a photograph area. When such an error occurs, the edge parts of the characters in the mixed area cannot be enhanced and the legibility of the characters is degraded.

SUMMARY OF THE INVENTION

The present invention may provide an apparatus, a method, and a computer-readable recording medium that substantially eliminates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an apparatus, a method, and a computer-readable recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an apparatus including an obtaining part for obtaining image data of a document and a processing part for performing a color material saving process on the image data, the image data including an edge part and a non-edge part, including: a determining part configured to determine whether the document includes a low line-screen ruling area; wherein when the document is determined not to include the low line-screen ruling area, the processing part is configured to perform a first process so that an amount of color material reduced for forming the non-edge part is greater than an amount of color material reduced for forming the edge part, wherein when the document is determined to include the low line-screen ruling area, the processing part is configured to perform a second process so that the amount of color material reduced for forming the edge part and the non-edge parts are uniform.

Further, another embodiment of the present invention provides a method for obtaining image data of a document and performing a color material saving process on the image data, the image data including an edge part and a non-edge part, including the steps of: a) determining whether the document includes a low line-screen ruling area; b) performing a first process so that an amount of color material reduced for forming the non-edge part is greater than an amount of color material reduced for forming the edge part when the document is determined not to include the low line-screen ruling area; and c) performing a second process so that the amounts of color material reduced for forming the edge part and the non-edge parts are uniform when the document is determined to include the low line-screen ruling area.

Further, yet another embodiment of the present invention provides a computer-readable medium on which a program is recorded for causing a computer to execute an image processing method for obtaining image data of a document and performing a color material saving process on the image data, the image processing method including the steps of: a) determining whether the document includes a low line-screen ruling area; b) performing a first process so that an amount of color material reduced for forming the non-edge part is greater than an amount of color material reduced for forming the edge part when the document is determined not to include the low line-screen ruling area; and c) performing a second process so that the amounts of color material reduced for forming the edge part and the non-edge parts are uniform when the document is determined to include the low line-screen ruling area.

Other objects, features and advantages of the present invention will become more apparent from the following detailed description when read in conjunction with the accompanying drawings.

BRIEF DESCRIPTION OF THE DRAWINGS

FIG. 5 is schematic diagram for describing averaging of each of the DCT coefficients with the operation illustrated in FIG. 4;

FIG. 8 is a schematic diagram for describing determination of document types;

FIG. 9 is a schematic diagram for describing processes performed according to corresponding to determined document types;

FIG. 16 is a block diagram illustrating a halftone dot determining part of an image area separating part according to an embodiment of the present invention;

FIGS. 17A and 17B are schematic diagrams for describing peak pixel detection with a 3×3 block and a 5×5 block;

FIG. 22 illustrates examples of edge amount detecting filters used by the edge amount calculating part of FIG. 21;

FIG. 26 illustrates examples of edge amount detecting filters used by the edge detecting portions of FIG. 25;

FIG. 27 illustrates an example of a filter used for sign determination;

DETAILED DESCRIPTION OF THE PREFERRED EMBODIMENTS

Figure 1:
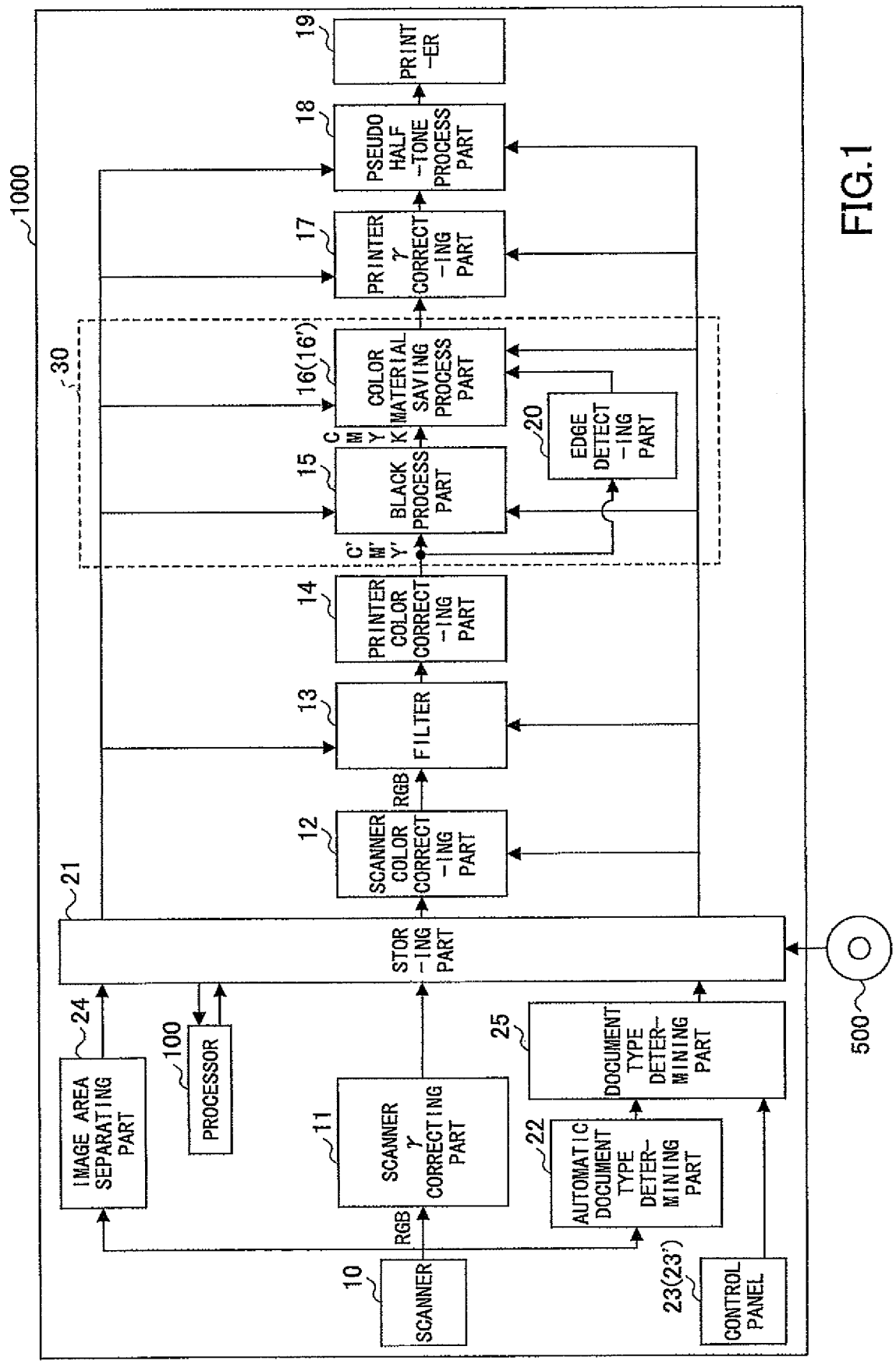
FIG. 1 is a block diagram illustrating an image processing apparatus according to an embodiment of the present invention.

In general, photograph images can be categorized into photographic paper photograph images (e.g., silver film photographs obtained from film development, print photographs obtained by outputting digital photograph data from a printer) and printed photograph images widely used in the field of printing. Unlike digital images that are formed by forming dots in corresponding pixels that are packed in a matrix without any in-between space, printed photograph images are formed as halftone dot images that are obtained by applying a printing material as dots onto halftone dot areas arranged at predetermined intervals. The inventor of the present invention has discovered that, although image quality may be degraded by performing a color material saving process for enhancing edge parts of a target photograph image, the degradation of image quality can be maintained within a permissible range (considering the tradeoff with respect to the color material saving process) in a case where the target photograph image is a photographic paper image having higher image quality than a printed photograph image. Further, even if the target photograph image is a printed photograph image (halftone dot image having lower image quality compared to a photographic paper image), a printed photograph image formed of high line-screen ruling (e.g., printed with a line-screen ruling of 150 lpi or 175 lpi) can have degradation of its image quality maintained within a permissible range (considering the tradeoff with respect to the color material saving process) in a case where a color material saving process for enhancing edge parts of the target photograph image is performed.

The inventor of the present invention has also discovered that, in a case where the target photograph image is a printed photograph formed of low line-screen ruling (e.g., printed with a line-screen ruling of 100 lpi or less), in addition to degradation of image quality, gradation may become inverted when a color material saving process for enhancing edge parts of the target photograph image is performed. After the color material saving process is performed, areas that had relatively low density prior to the color material saving process become areas having relatively high density. Thus, in a case of performing the color material saving process on a printed photograph, the degradation of image quality becomes beyond a permissible range.

The inventor has noted that a representative example of a document including photograph images having character images and low line-screen ruling images mixed together is a newspaper document. Further, the inventor has discovered that, if the target photograph image is an image having little tone changes such as a graph or a figure (unlike a photograph image having many tone changes), gradation inversion will seldom occur in a case where a color material saving process for enhancing edge parts of the target photograph image is performed.

In view of the above, the below-described embodiments of the present invention can control image degradation due to performing a color material saving process within a permissible range while preventing degradation of character legibility of, for example, an original image having a photograph image in the background of a character image.

<First Embodiment>

FIG. 1 is a block diagram illustrating an image processing apparatus according to an embodiment of the present invention.

<Scanner>

First, a scanner (original image data obtaining part) 10 obtains image data including R (Red), G (Green), B (Blue) signals (data of original image). Then, a γ correcting part 11 performs γ correction on the RGB signals. Thus, the RGB signals are converted from signals having linear reflectance to signals having linear density.

<Control Panel>

A control panel (saving mode setting part) 23 is configured to set a color material saving mode by displaying on/off of a color material saving mode and allowing the user to select the on/off of the color material saving mode. Further, the control panel 23 is also configured to set the type of document (document type) desired to be processed by displaying the document type and allowing the user to select a document type from various document types. The choices of the document types include, for example, <0> automatic, <1> character/photograph document, <2> character document, <3> photograph document, <4> map document, and <5> newspaper document. In a case where <1> character/photograph document is selected, the user is to select whether a photograph part of the original image is a <1-1> printed photograph or a <1-2> photographic paper photograph. Likewise, in a case where <3> photograph document is selected, the user is to select whether the original image is a <3-1> printed photograph or a <3-2> photographic paper photograph.

<Automatic Determining of Document Type>

Figure 2:
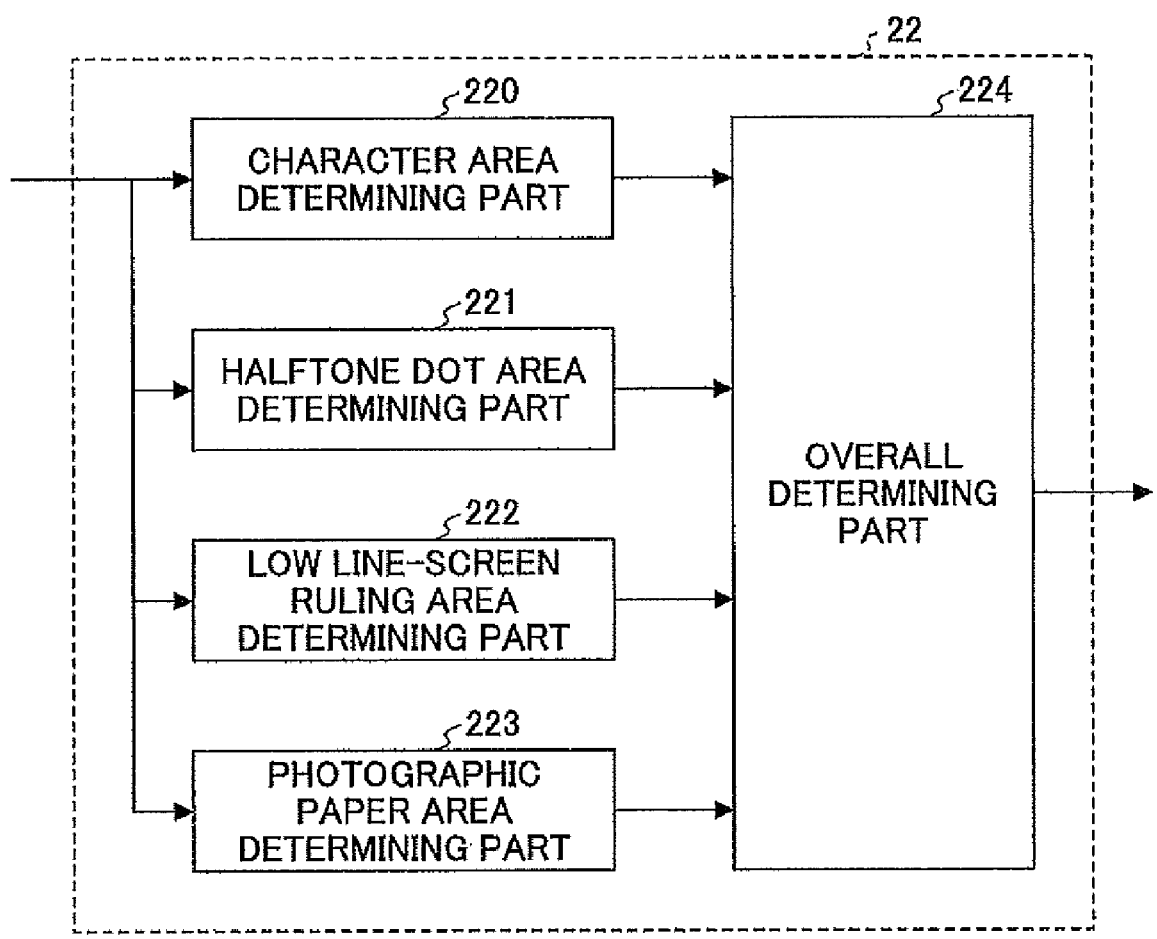
FIG. 2 is a block diagram illustrating an automatic document type determining part according to an embodiment of the present invention.

An automatic document type determining part 22 is configured to automatically determine the document type based on RGB signals (original image data) obtained from the scanner 10. FIG. 2 is a block diagram illustrating the automatic document type determining part 22 according to an embodiment of the present invention. The automatic document type determining part 22 includes a character area determining part 220 for determining whether there is a character area in the original image, a halftone dot area determining part 221 for determining whether there is a halftone dot area in the original image, a low line-screen ruling area determining part 222 for determining whether there is a low line-screen ruling area in the original image, and a photographic paper area determining part 223 for determining whether there is a photographic paper area in the original image. An overall determining part 224 determines the document type according to determination results obtained from the character area determining part 220, the halftone dot area determining part 221, the low line-screen ruling area determining part 222, and the photographic paper area determining part 223. In a case where a low line-screen ruling area exists in the original image, the overall determining part 224 determines that the original image is a [4] low line-screen ruling document. In a case where no low line-screen ruling area exists in the original image, the overall determining part 224 determines the document type by referring to other determination results as follows. For example, in a case where a character area and a halftone dot area exist in the original image, the overall determining part 224 determines that the original image is a [1] character/photograph document and that its photograph part is a [1-1] printed photograph. In a case where a character area and a photographic paper area exist but no halftone dot area exists in the original image, the overall determining part 224 determines that the original image is a [1] character/photograph document and that its photograph part is a [1-2] photographic paper photograph. In a case where a halftone dot area exists but no character area exists in the original image, the overall determining part 224 determines that the original image is a [3] photograph document and that its photograph part is a [3-1] printed photograph. In a case where a photographic paper photograph exists but no character area or halftone area exist in the original image, the overall determining part 224 determines that the original image is a [3] photograph document and that its photograph part is a [3-1] printed photograph. In a case that does not apply to the above-described cases, the overall determining part 224 determines that the original image is a [2] character document.

The character area determining part 220 may use a document type determining method based on counted values obtained by counting the pixels of a binary area (character area) and the pixels of a multiple valued area as described in Japanese Laid-Open Patent Publication No. 4-96571. Further, the halftone dot area determining part 221 may use a document type determining method based on counted values obtained by counting the pixels of a halftone dot area (peak pixel) as described in Japanese Laid-Open Patent Publication No. 7-298074. Further, the photographic paper area determining part 223 may use a document type determining method based on counted values obtained by counting the pixels of a photograph area (intermediate level pixel) as described in Japanese Laid-Open Patent Publication No. 7-298074.

<Determining of Low Line-screen Ruling Area>

Figure 3:
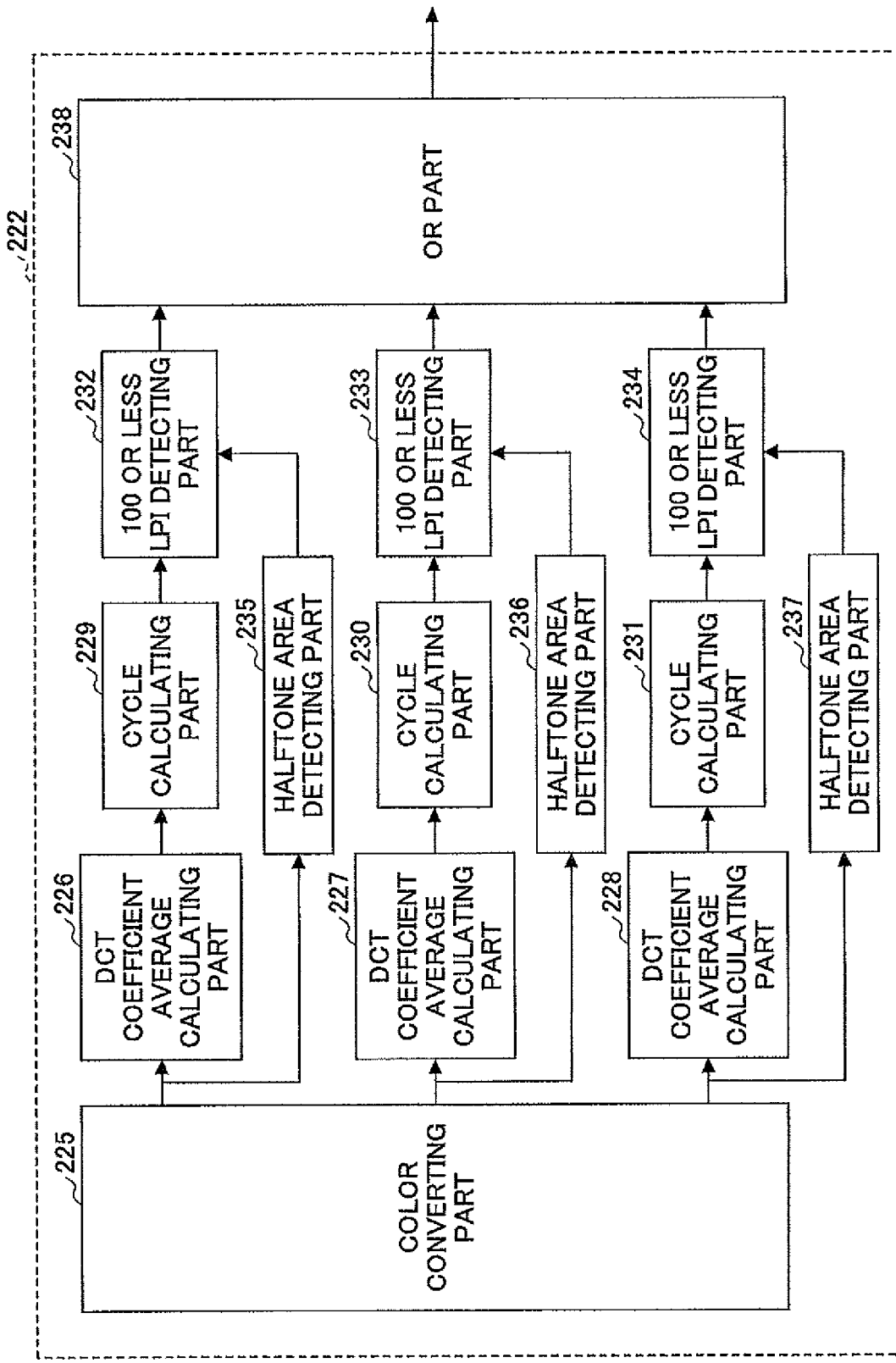
FIG. 3 is a block diagram illustrating a low line-screen ruling determining part according to an embodiment of the present invention.

FIG. 3 is a block diagram illustrating the low line-screen ruling determining part 222 according to an embodiment of the present invention. The low line-screen ruling determining part 222 converts RGB data to CMY data (Cyan, Magenta, Yellow color component data included in the image data to be formed) by using a color converting part 225, detects a low line-screen ruling area corresponding to each of the C, M, Y data, and performs logical addition on the detection results by using an OR operating part 238. In a case where there is a low line-screen area corresponding to any one of the C, M, Y data in the original image data, the low line-screen ruling determining part 225 determines (confirms) that a low line-screen ruling determining area exists in the original image. In the detection of the low line-screen ruling area according to this embodiment, a low line-screen ruling area of 100 lines per inch (lpi) or less is detected by calculating cycles (periods) using a discrete cosine transform (DCT). In this embodiment, the low line-screen ruling determining part 222 includes DCT coefficient average calculating parts 226, 227, 228, cycle calculating parts 229, 230, 231, halftone (intermediate) area detecting parts 235, 236, 237, and 100 or less lpi detecting parts 232, 233, 234. Details of the DCT are described in, for example, Japanese Laid-Open Patent Publication No. 4-21265.

In a case of detecting a halftone area of an original image, only a block having a pixel value average within a predetermined range (th1, th2) is determined to be a valid block because cycles of a document appear mainly at intermediate parts (i.e., parts where all pixels are not black or where all pixels are not white). Accordingly, the detecting of a low line-screen ruling area of 100 lpi or less is performed only for the block determined as being valid. Since cycles of halftone dots cannot be correctly detected (erroneous detection) at highlight areas and dark areas of an image, highlight areas and dark areas of the original image are not subject to cycle detection in order to prevent such erroneous detection.

Figure 4:
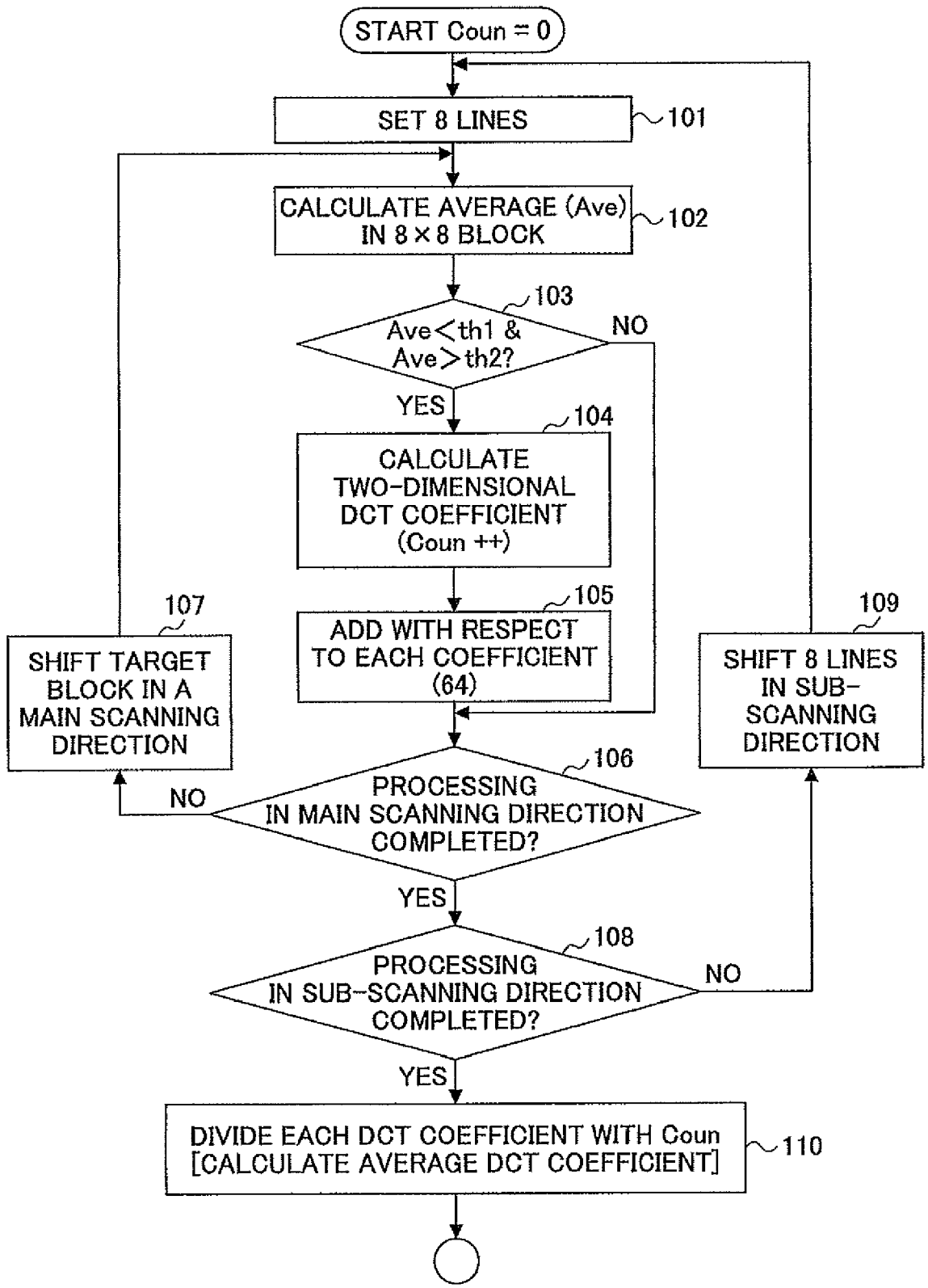
FIG. 4 is a flowchart of an operation performed by the DCT (discrete cosine transform) coefficient average calculating parts according to an embodiment of the present invention.

FIG. 4 illustrates a flowchart of an operation performed by the DCT coefficient average calculating parts 226, 227, 228 according to an embodiment of the present invention. FIG. 5 is schematic diagram for describing averaging of each of the DCT coefficients with the operation illustrated in FIG. 4. In this embodiment, the DCT transformation is performed in block units where each block has 8 pixels×8 pixels. First, image data equivalent to 8 lines are set (Step S101). Then, the average value of the pixels in a block Ave is calculated (Step S102). Then, as described above, because cycles of a document appear mainly at halftone parts (in this example, a block where all of its pixels are not black and where all of its pixels are not white), only a block having a pixel value average within a predetermined range (th1, th2) is determined to be a valid block (Step S103). Then, a two-dimensional DCT coefficient(s) is calculated from the valid block(s) (Step S104). Then, the coefficient(s) is added (Step S105). For example, as illustrated in FIG. 5, DCT coefficients situated at the same location of each block A00, B00, C00 are added. Then, after the processes in the steps S102-S105 are performed on a target block, the processes in the steps S102-S105 are performed on a next target block (Step S107). After the processes in the steps S102-S105 are performed on all target blocks with respect to a main scanning direction (Yes in Step S106), the processes in the steps S102-S105 are performed on target blocks with respect to a sub-scanning direction (Step S109). After the processes in the steps S102-S105 are performed on all target blocks with respect to a sub-scanning direction (Yes in Step S108), an average DOCT is calculated (Step S110). In the example illustrated in FIG. 5, an average DCT of three blocks are obtained F00=(A00+B00+C00)/3, . . . , F77= (A77+B77+C77).

Figure 6:
FIG. 6 is a schematic diagram illustrating a 3×3 mask used for calculating a cycle.

In a case where there is a certain cycle in a document, a peak appears in the DCT coefficients. Therefore, by applying a 3×3 mask to the DCT coefficients of a block, the location of the peak can be detected. In this embodiment, by applying a mask as illustrated in FIG. 6 to the average DCT coefficients of the 8×8 blocks, a maximum value for each location of the 8×8 blocks is calculated according to a formula illustrated in FIG. 6.

Figure 7:
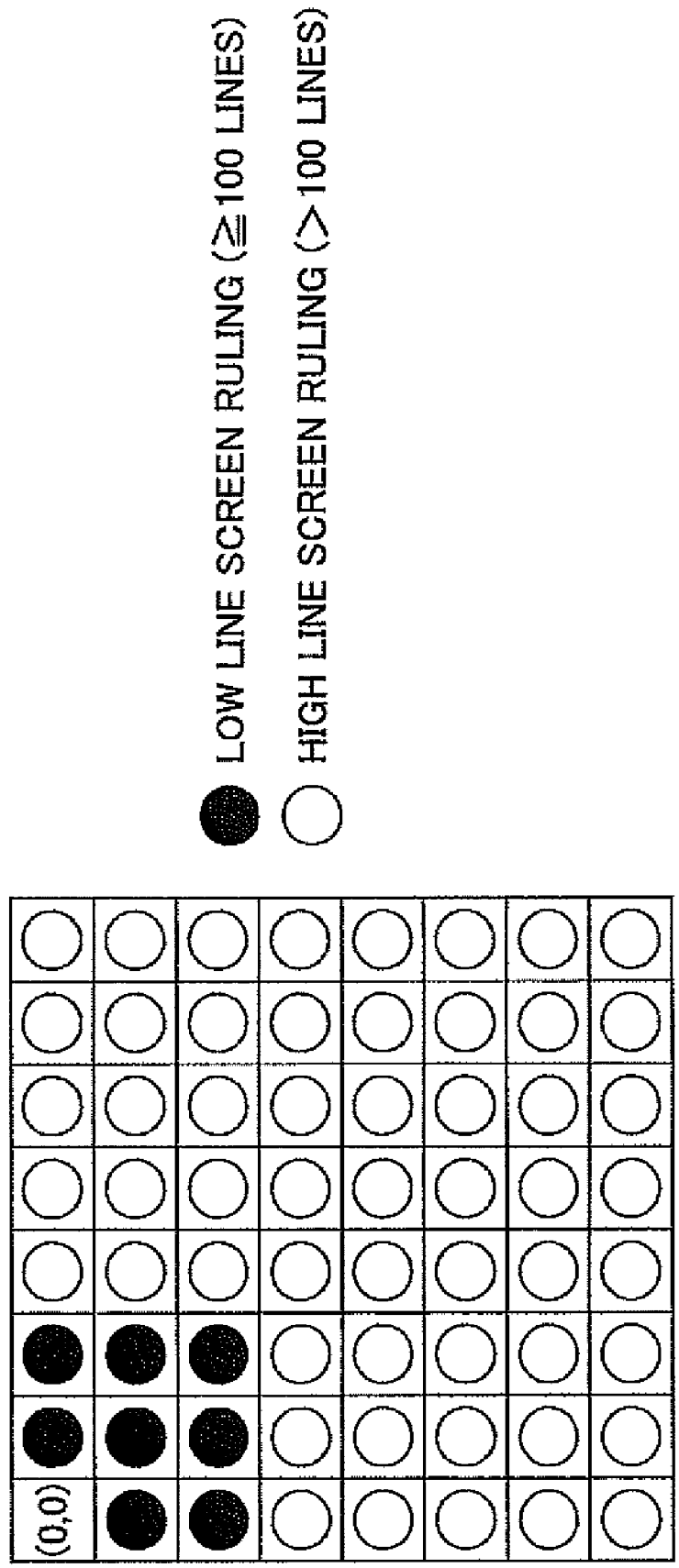
FIG. 7 is a schematic diagram for determining low-line screen ruling according to an M value at each location of an 8×8 area.

The 100 or less lpi detecting parts 232, 233, 234 detect cycles in a document by referring to the location of a peak having a maximum value. That is, the 100 or less lpi detecting parts 232, 233, 234 determine whether there is a low line-screen ruling part that is no greater than 100 lpi (i.e. 100 lpi or less) in an original image. In this embodiment, the 100 or less lpi detecting parts 232, 233, 234 determine that a low line-screen ruling part exists in the original image when a peak is located in the area illustrated with black circles in FIG. 7 and the maximum value M of the peak is no less than a predetermined value. The 100 or less lpi detecting parts 232, 233, 234 determines that no low line-screen ruling part exists in the original image when no peak is detected, when the maximum value M of the peak is less than the predetermined value, or when the peak is located in the area illustrated with white circles in FIG. 7.

Although this embodiment describes detection of low line-screen ruling areas by using DCT, other methods may be used. For example, detection of low line-screen ruling areas may be performed by pattern matching as described in Japanese Laid-Open Patent Application No. 1-133470 where a cycle having a closest match among plural cycles detected from plural locations is determined as the cycle of a document.

<Determining of Document Type>

A document type determining part 25 determines the type of document according to the type of document selected from the control panel 23 by the user and a determination result of the automatic document type determining part 22 as illustrated in FIG. 8. In a case where the document type selected by the user is a type other than <0>automatic or <1-1> printed photograph of <1> character/photograph, the document type determining part 25 determines that the document type is the type selected by the user. In a case where the user selects <0> automatic, the document type determining part 25 validates the determination result of the automatic document type determining part 22. In a case where the user selects <1-1> printed photograph of <1> character/photograph, the document type determining part 25 validates the determination result of the automatic document type determining part 22 only when the determination result of the automatic document type determining part 22 is [4] a low line-screen ruling document.

Therefore, the control panel 23, the automatic document type determining part 22, and the document type determining part 25 function as an original image type data obtaining part for obtaining the type of document of the original image.

<Separating of Image Area>

Figure 10:
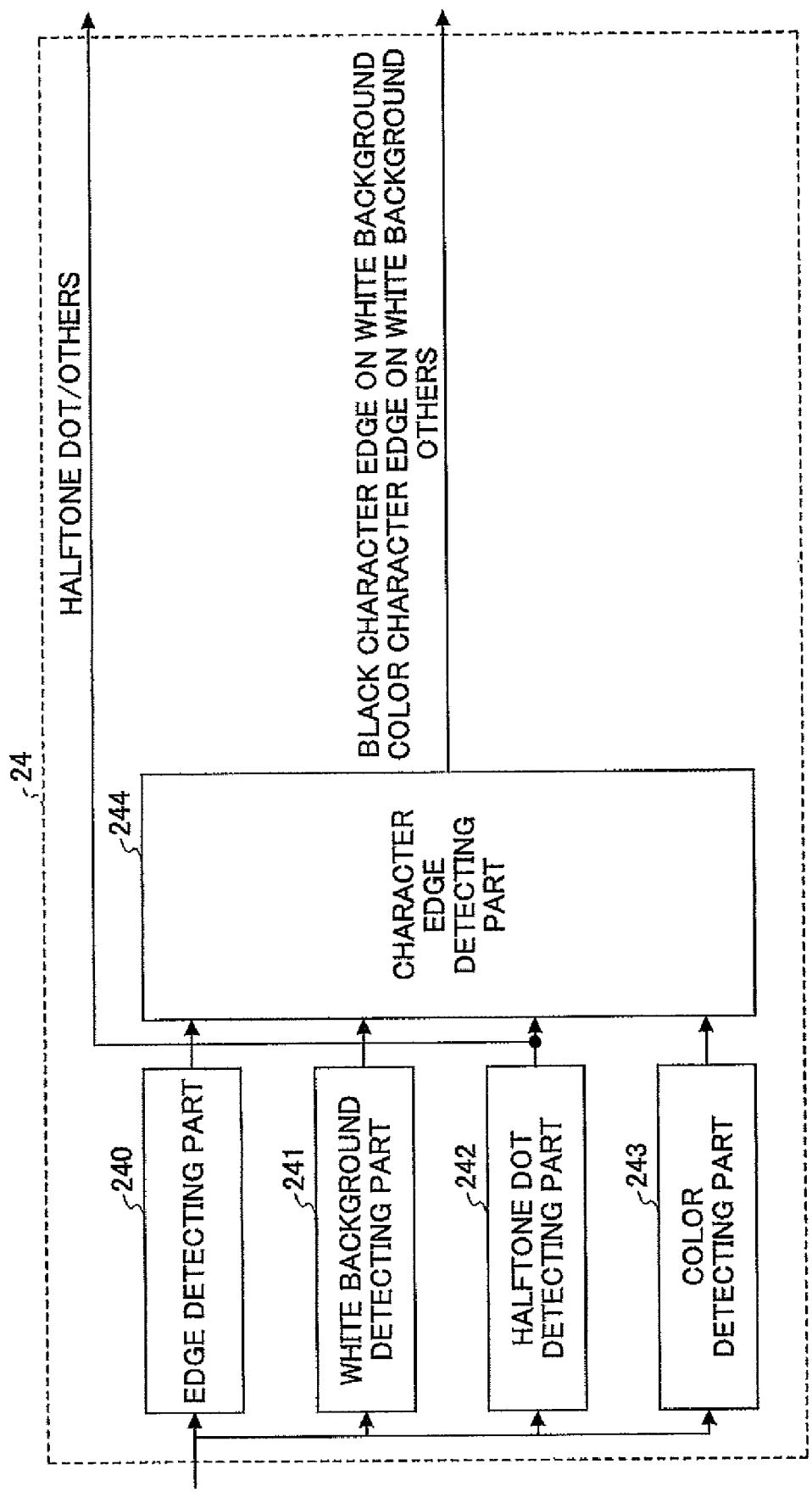
FIG. 10 is a block diagram illustrating an image area separating part according to an embodiment of the present invention.

FIG. 10 is a block diagram illustrating an image area separating part 24 according to an embodiment of the present invention. The image area separating part 24 includes an edge determining part 240, a white background determining part 241, a halftone dot determining part 242, and a color determining part 243. Next, the functions and processes of the edge determining part 240, the white background determining part 241, the halftone dot determining part 242, and the color determining part 243 of the image area separating part 24 are described.

<Determining of Edges>

Figure 11:
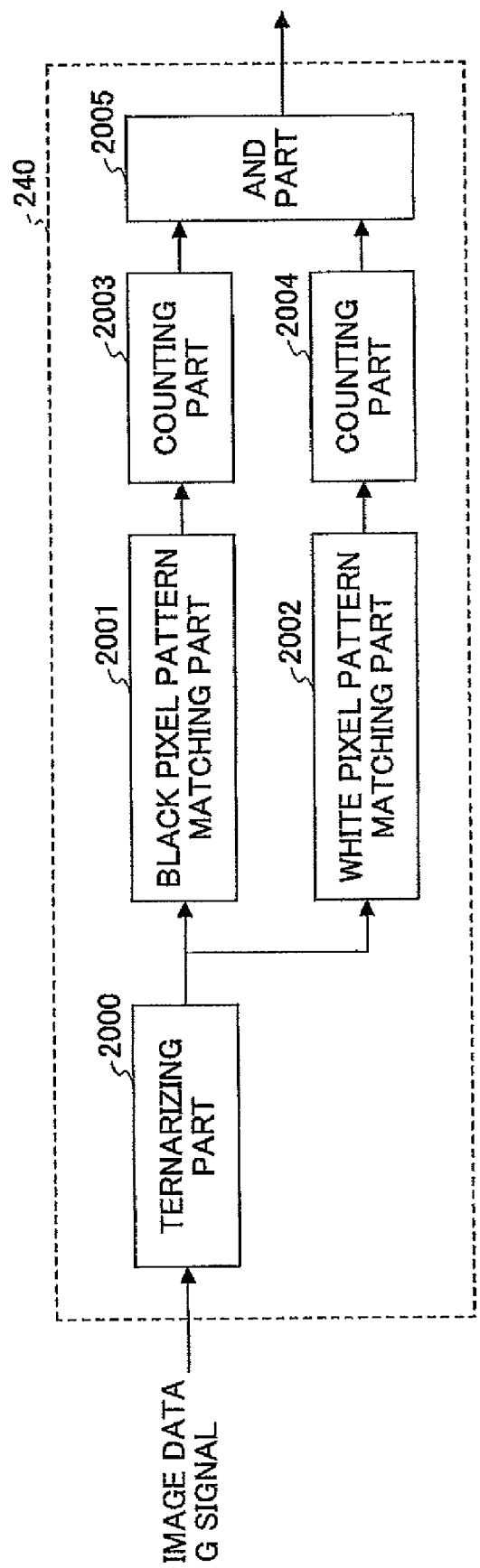
FIG. 11 is a block diagram illustrating an edge determining part according to an embodiment of the present invention.
Figure 12:
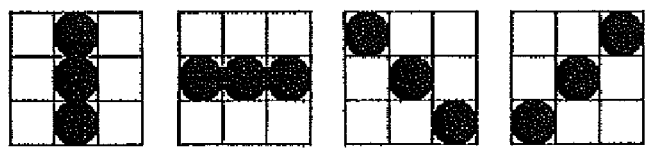
FIG. 12 illustrates matrices used for pattern matching of black pixels.
Figure 13:
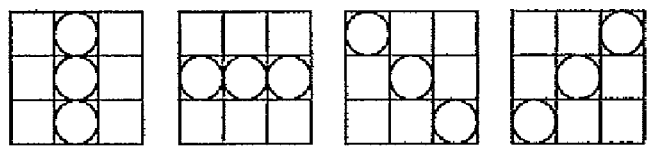
FIG. 13 illustrates matrices used for pattern matching of white pixels.

FIG. 11 is a block diagram illustrating the edge determining part 242 according to an embodiment of the present invention. The edge determining part 242 includes a ternarizing circuit 2000. Among the R,G,B data (each color consisting of 8 bits) of an input image, the G data (G signal) is ternarized by the ternarizing circuit 2000. The ternarizing circuit 2000 ternarizes the G data by using two thresholds th1 and th2 (th1<th2). In a case where "0" represents a shadow side and "255" represents a highlight side, a pixel is assumed as a black pixel when the G data satisfy a relationship of "0≦G≦th1", assumed as an intermediate pixel when the G data satisfy a relationship of "th1<G<th2", and assumed as a white pixel when the G data satisfy a relationship of "th2≦G≦255". The edge determining part 242 further includes a black pixel pattern matching part 2001. In a case where a black pixel pattern in a 3×3 matrix matches any one of the patterns illustrated in FIG. 12, the black pixel pattern matching part 2001 determines that a target pixel is a connecting black pixel. The edge determining part 242 further includes a white pixel pattern matching part 2002. Likewise, in a case where a white pixel pattern in a 3×3 matrix matches any one of the patterns illustrated in FIG. 13, the white pixel pattern matching part 2002 determines that a target pixel is a connecting white pixel. The edge determining part 240 further includes counting parts 2003 and 2004. The counting part 2003 counts the number of connecting black pixels in the 3×3 pixel matrix having a target pixel at the center of the matrix. The counting part 2004 counts the number of connecting white pixels in the 3×3 pixel matrix having a target pixel at the center of the matrix. In a case where the value of the counted number is no less than a predetermined value (e.g., 2), each of the counting parts 2003, 2004 outputs a counting result "1". The edge determining part 240 further includes an AND part. The AND part determines that an edge part exists in a case where the counting results from the counting parts 2003, 2004 are both "1". In other words, because an edge part of a character exhibits a characteristic where connecting white pixels and connecting black pixels are distributed inside a block with a predetermined density, the edge determining part 240 determines whether an edge part exists in an area of an original image by using this characteristic.

Figure 14:
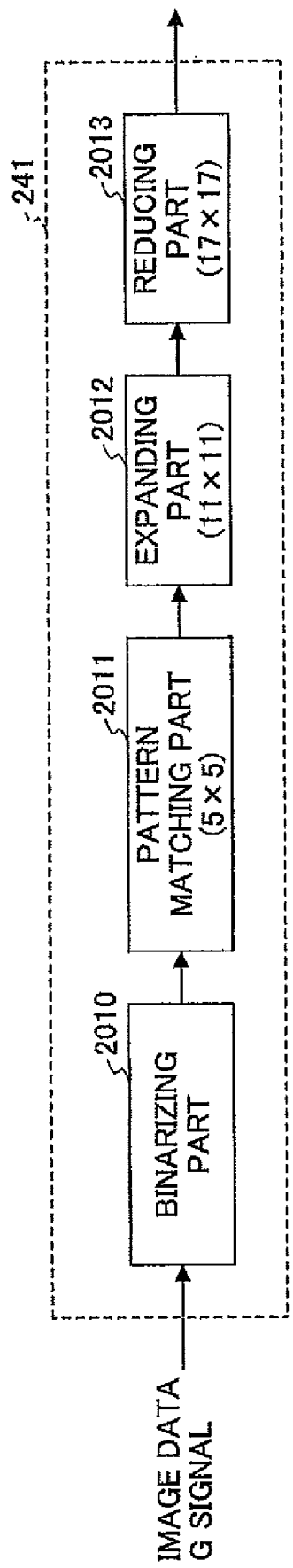
FIG. 14 is a block diagram illustrating a white determining part of an image area separating part according to an embodiment of the present invention.
Figure 15:
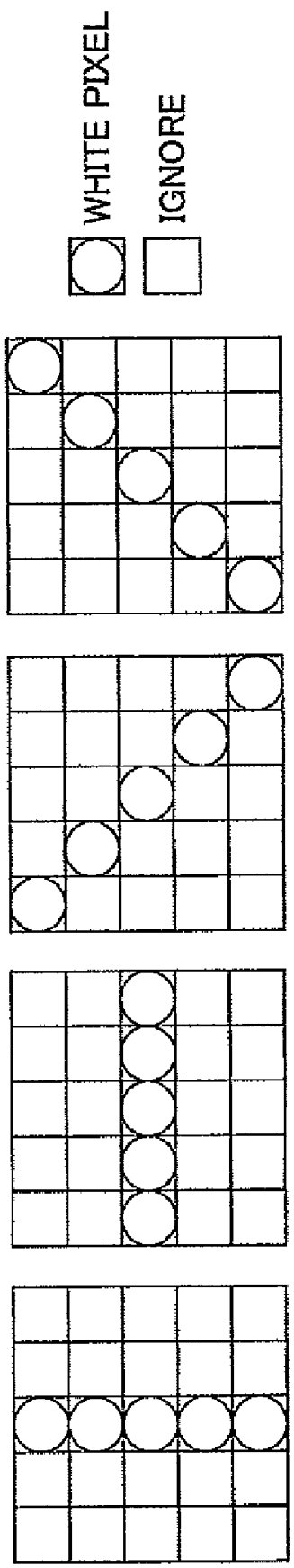
FIG. 15 illustrates matrices used for pattern matching of consecutive white pixels.

FIG. 14 is a block diagram illustrating the white determining part 241 of the image area separating part 24. The image area separating part 24 has a binarizing part 2010 for determining whether a G signal of the original image data is a white pixel or a black pixel and binarizes the G signal according to the determination. Then, a pattern matching part 2011 performs pattern matching on a G signal determined to be a white pixel by the binarizing part 2010. The pattern matching part 2011 performs the pattern matching with respect to a block consisting of 5×5 pixels. The pattern matching part 2011 overturns the determination if the white pixel is arranged in a block alone by itself (i.e. isolated). In this embodiment, the pattern matching part 2011 determines whether a pattern of the G signal matches a pattern having white pixels consecutively arranged in four directions (vertically, horizontally, 2×diagonally) as illustrated in FIG. 15. If the patterns match, the pattern matching part 2011 determines that the G signal is a white pixel. If the patterns do not match, the pattern matching part 2011 overturns the determination of the binarizing part 2010 and determines that the G signal is a black pixel. Then, an expanding part 2012 performs an expanding process with respect to a block consisting of 11×11 pixels including a target pixel. If any one of the pixels in the block is a white pixel, the expanding part 2012 turns the target pixel to a white pixel. Then, a shrinking part 2013 performs a shrinking process with respect to a block consisting of 17×17 pixels including a target pixel. If any one of the pixels in the block is a black pixel, the shrinking part 2013 turns the target pixel to a black pixel. An area of an original image having white pixels remaining after the shrinking process is determined as an area corresponding to a white background.

<Determining of Halftone Dots>

FIG. 16 is a block diagram illustrating the halftone dot determining part 242 of the image area separating part 24 according to an embodiment of the present invention. The halftone dot determining part 242 determines halftone dots by using a peak pixel detecting method. The peak pixel detecting method determines whether a target pixel is located at a summit (pole point) indicating a peak or a valley of density change by determining a relationship of the density of the target pixel and the density of surrounding pixels. For example, in a block consisting of M×M pixels, the halftone dot determining part 242 uses the following Formulas 1 and 2 to determine whether the target pixel is situated on a pole point when the target pixel has a density higher or lower than the density of all of its surrounding pixels. A first peak pixel detecting part 2020 included in the halftone dot determining part 242 detects a peak pixel by using Formula 1 (see below). The first peak pixel detecting part 2020 performs the peak detection with respect to a block consisting of 3×3 pixels. A second peak pixel detecting part 2021 also included in the halftone dot determining part 242 detects a peak pixel by using Formula 2 (see below). The second peak pixel detecting part 2021 performs the peak detection with respect to a block consisting of 5×5 pixels.

[Formula 1]
In a case where M=3 (see FIG. 17A)

$$|2m_0-m_1-m_8| \geq \Delta m_{TH} \text{ AND}$$

$$|2m_0-m_2-m_7| \geq \Delta m_{TH} \text{ AND}$$

$$|2m_0-m_3-m_6| \geq \Delta m_{TH} \text{ AND}$$

$$|2m_0-m_4-m_5| \geq \Delta m_{TH}$$

[Formula 2]
In a case where M=5 (see FIG. 17B)

$$|2m_0-m_3-m_{22}| \geq \Delta m_{TH} \text{ AND}$$

$$|2m_0-m_8-m_{17}| \geq \Delta m_{TH} \text{ AND}$$

$$|2m_0-m_1-m_{24}| \geq \Delta m_{TH} \text{ AND}$$

$$|2m_0-m_7-m_{18}| \geq \Delta m_{TH}$$

In other words, a center pixel is determined as a peak pixel when a threshold $\Delta m_{TH}$ is less than the absolute value of the difference between the average density of two symmetrically arranged pixels having the center pixel interposed therebetween and the density of the center pixel. Although the peak pixel determination can be performed on each of the R, G, B signals, the peak pixel determination may be performed on the G signal in a case of simplifying operations. Then, by referring to the data of the peak pixels obtained by the peak pixel determination, it is determined whether the block containing the peak pixel is a halftone dot area. If any one of the first and second peak pixel detecting parts 2020, 2021 reports detection of a peak pixel to an OR part (OR circuit) 2022, the OR part 2022 determines existence of a peak pixel. Then, according to the determination by the OR part 2022, a block forming part 2023 determines whether each block consisting of 4×4 pixels contains a peak pixel. Any 4×4 block including at least one peak pixel is determined as an active block by the block forming part 2023. Then, a density correcting part 2024 counts the number of active blocks in a 5×5 block having a target block as its center and determines that the target block is a halftone dot block when the counted number of active blocks is no less than a predetermined number. Then, an expanding part 2025 performs an expanding process on a 3×3 block and determines that the target block is a halftone dot area if at least one halftone dot block exists in the 3×3 block of an original image.

<Determining of Color>

Figure 18:
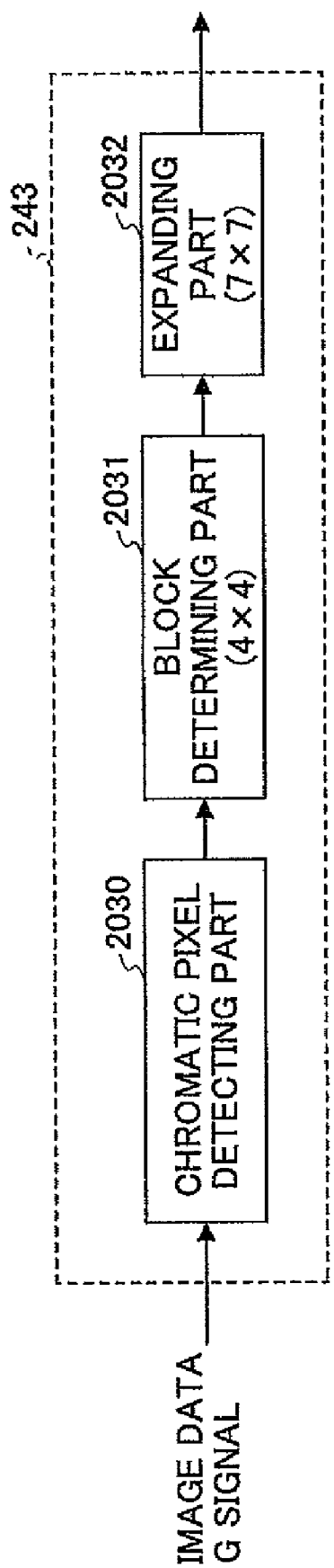
FIG. 18 is a block diagram illustrating a color determining part of an image area separating part according to an embodiment of the present invention.

FIG. 18 is a block diagram illustrating a color determining part 243 of the image area separating part 24 according to an embodiment of the present invention. A chromatic pixel detecting part 2030 included in the color determining part 243 determines that a pixel satisfying a relationship of "NMax (|R-G|, |G-B|, |B-R|)>th3 (th3 being a predetermined threshold)" is a chromatic pixel. According to the determination by the chromatic pixel detecting part 2030, a block determining part 2031 determines whether each block consisting of 4×4 pixels contains a chromatic pixel. Any 4×4 block including at least one chromatic pixel is determined as an active block by the block determining part 2031. Then, an expanding part performs an expanding process on a 7×7 block and determines that a target block includes a chromatic color if at least one active block exists in the 7×7 block. The above-described color determining methods may be performed together with other methods. For example, in order to determine colors with higher accuracy, a process for preventing erroneous determination may be added such as performing a process similar to the counting process described in the method of determining halftone dot areas.

<Detecting of Character Edge>

Figure 19:
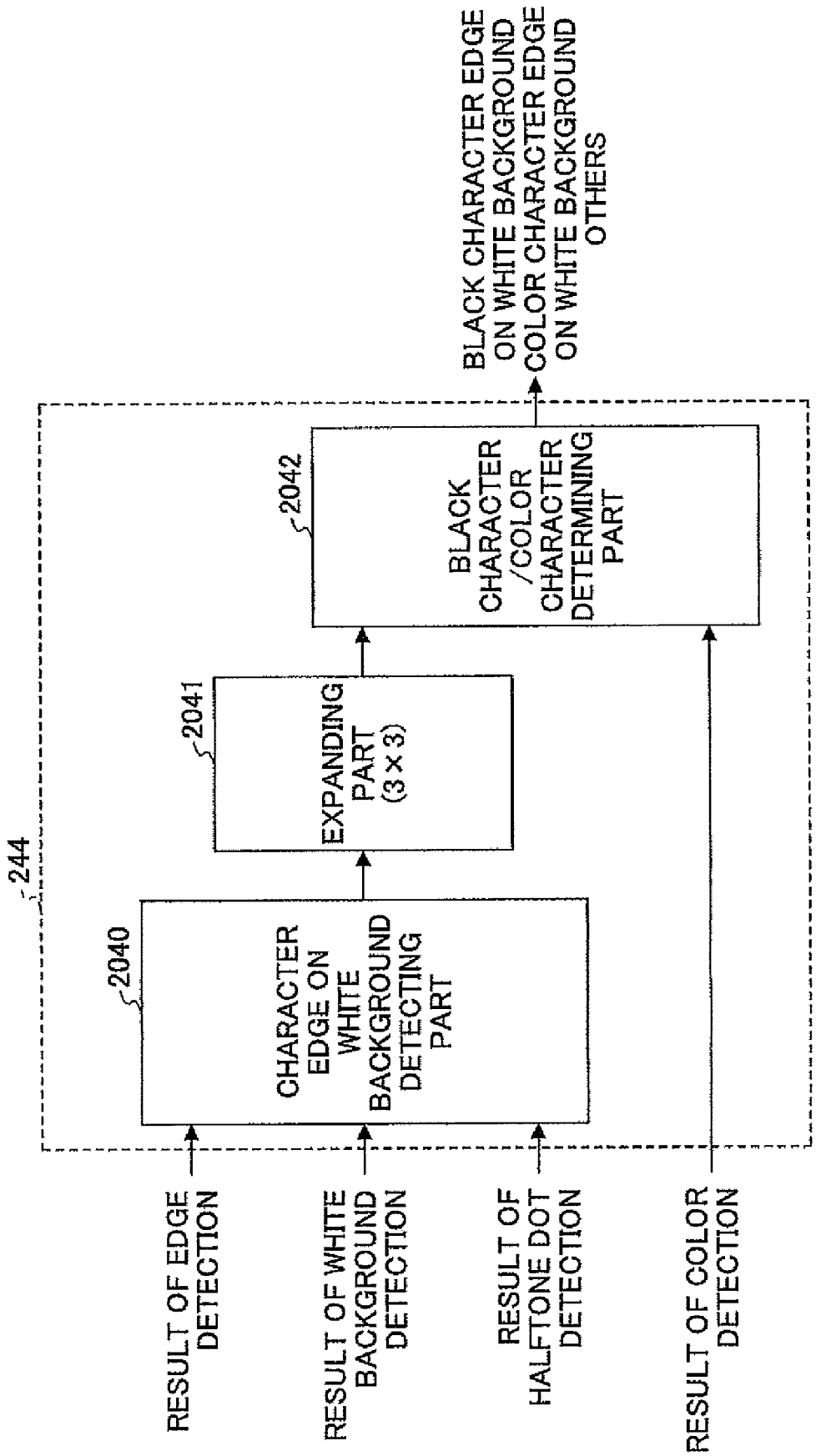
FIG. 19 is a block diagram illustrating a character edge detecting part according to an embodiment of the present invention.

FIG. 19 is a block diagram illustrating a character edge detecting part 244 also included in the image area separating part 24 according to an embodiment of the present invention. The character edge detecting part 244 has a character edge white background detecting part 2040 for determining a character edge candidate pixel according to determination results from the edge determining part 240, the white background determining part 241, and the halftone dot determining part 242. The character edge white background detecting part 2040 determines that a pixel is a character edge candidate pixel when the pixel has an edge, a white background, and a non-halftone dot. For example, the character edge white background detecting part 2040 determines that a pixel having a dot at an inner edge and a dot at an outer edge is a character edge candidate area by referring to determination results from the edge determining part 240. Since a pixel having two dots (one at an inner edge and another at an outer edge) may be insufficient for performing a filtering process by the below-described filter 13, an expanding part 2041 performs an expanding process and determines whether a block consisting of 3×3 pixels, which has a target pixel at its center, includes a pixel having a character edge on a white background (also referred to as "character edge white background candidate pixel"). The expanding part 2041 determines that the target pixel is a character edge when the block includes at least one character edge white background candidate pixel. Although the amount of expansion by the expanding part 2041 is 3×3 pixels, the amount of expansion may be, for example, 5×5 pixels depending on color displacement of a scanner or a filtering process performed by a filter. Then, a black character/color character determining part 2042 determines that an area of an original image includes a "color character on a white background" when the area includes a character edge on a white background and a chromatic color according to the determination results from the expanding part 2041 and the color determining part 243. Further, the black character/color character determining part 2042 determines that an area of an original image includes a "black character on a white background" when the area includes a character edge on a white background and an achromatic color according to the determination results from the expanding part 2041 and the color determining part 243.

<Storing>

A storing part 21 temporarily stores image data obtained from the scanner 10 including image data subjected to γ correction by the γ correcting part 11, determination results from the document type determining part 25, and determination results from the image area separating part 24 for synchronization of various processes. The storing part may also store information indicating turning on/off of a color material saving mode at the control panel 23. Further, the storing part 21 also stores programs and data (e.g., data corresponding to each document type (document type data)) used for processes and operations executed by a processor 100 (e.g., CPU). Further, the storing part 21 may also store various programs and data recorded in a computer-readable recording medium 500 for causing the processor 100 or another computer to execute various processes and operations. The storing part 21 may include, for example, a RAM (Random Access Memory), a ROM (Read Only Memory), or a hard disk drive.

<Switching of Image Processes According to Document Type>

The processor 100 switches various image processes performed by corresponding parts (e.g., a scanner color correcting part 12, a filter 13, a black process part 15, a color material saving process part 16, a pseudo halftone process part 18, a printer γ correcting part 17, an edge detecting part 20) of the image processing apparatus 1000 in accordance with the document type data stored in the storing part 21 as illustrated in FIG. 9. The various image processes performed by the corresponding parts of the image processing apparatus 1000 according to an embodiment of the present invention are further described below.

<Scanner Color Correcting Part 12>

The scanner color correcting part 12 converts R, G, B signals to R', G', B' signals. The R, G, B signals depend on characteristics of the scanner 10 whereas the R', G', B' signals are independent of device characteristics. The scanner color correcting part 12 uses a color correcting parameter for printing and a color correcting parameter for photographic paper. The color correcting parameter for printing is set to a correct color for minimizing the average color difference between the colors of a halftone dot patch formed on a sheet of paper and R', G', B' values read out from the scanner 10. The color correcting parameter for photographic paper is set to a correct color for minimizing the average color difference between the colors of a patch formed on photographic paper and R', G', B' values read out from the scanner 10. The scanner color correcting part 12 switches the parameters to be used according to the document type as illustrated in FIG. 9.

<Filter 13>

Figure 20:
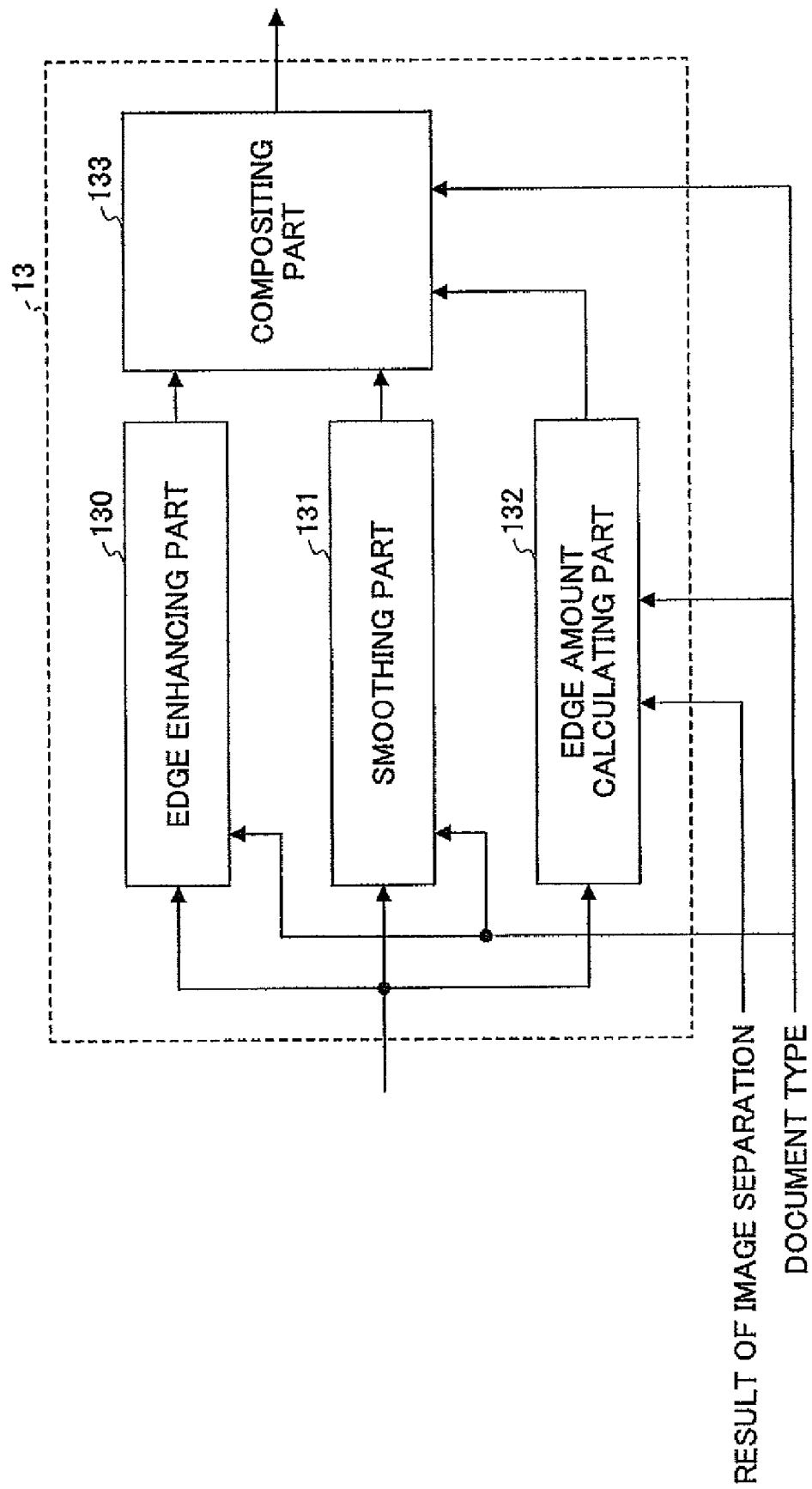
FIG. 20 is a block diagram illustrating a filter according to an embodiment of the present invention.

FIG. 20 is a block diagram illustrating the filter 13 according to an embodiment of the present invention. The filter 13 performs a filtering process such as an edge enhancing process by using an edge enhancing part 130 and a smoothing process by using a smoothing part 131. The edge enhancing part 130 and the smoothing part 131 use filter parameters that are switched in accordance with the document type. The filter 13 also uses an edge amount calculating part 132 for calculating an edge amount according to determination results from the image area separating part 24 and/or the document type. The filter 13 composites the process results output from the edge enhancing part 130 and the smoothing part 131 by using the compositing part 133. The compositing part 133 switches between a compositing process performed according to a fixed ratio corresponding to the document type (for example, by cancelling a compositing process performed according to the edge amount and the determination result from the image area separating part 24 and a compositing process performed according to a variable ratio corresponding to the edge amount.

In a case where the document type is a (7) low line-screen ruling document or a (8) newspaper, the compositing process is performed according to the fixed ratio. In a case of performing the compositing process according to the variable ratio, the compositing process is performed so that the proportion output from the edge enhancing part 130 becomes greater than that of the smoothing part 131 when the edge amount is large and becomes less than that of the smoothing part 131 when the edge amount is small.

Figure 21:
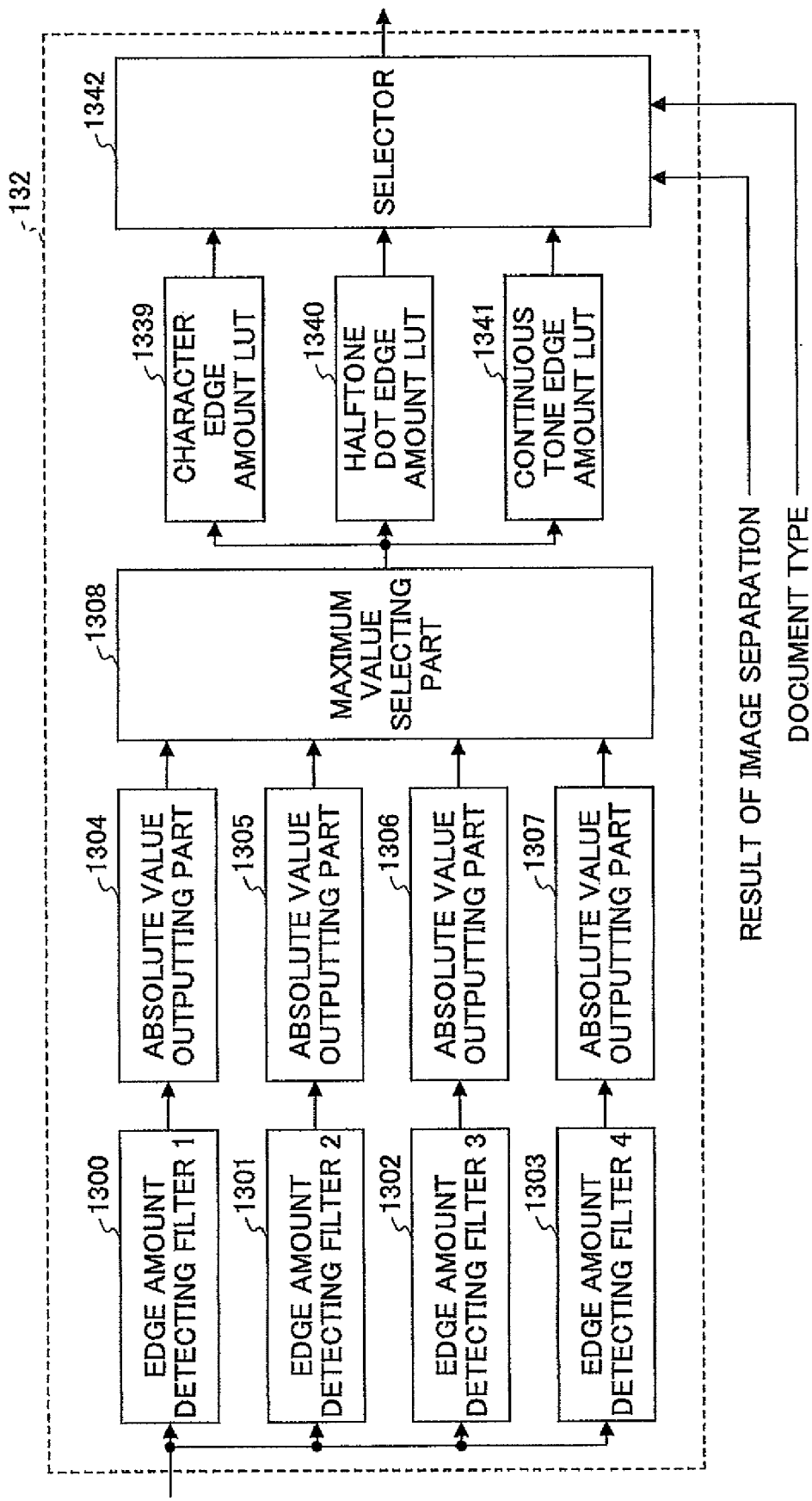
FIG. 21 is a block diagram illustrating an edge amount calculating part according to an embodiment of the present invention.
Figure 22:
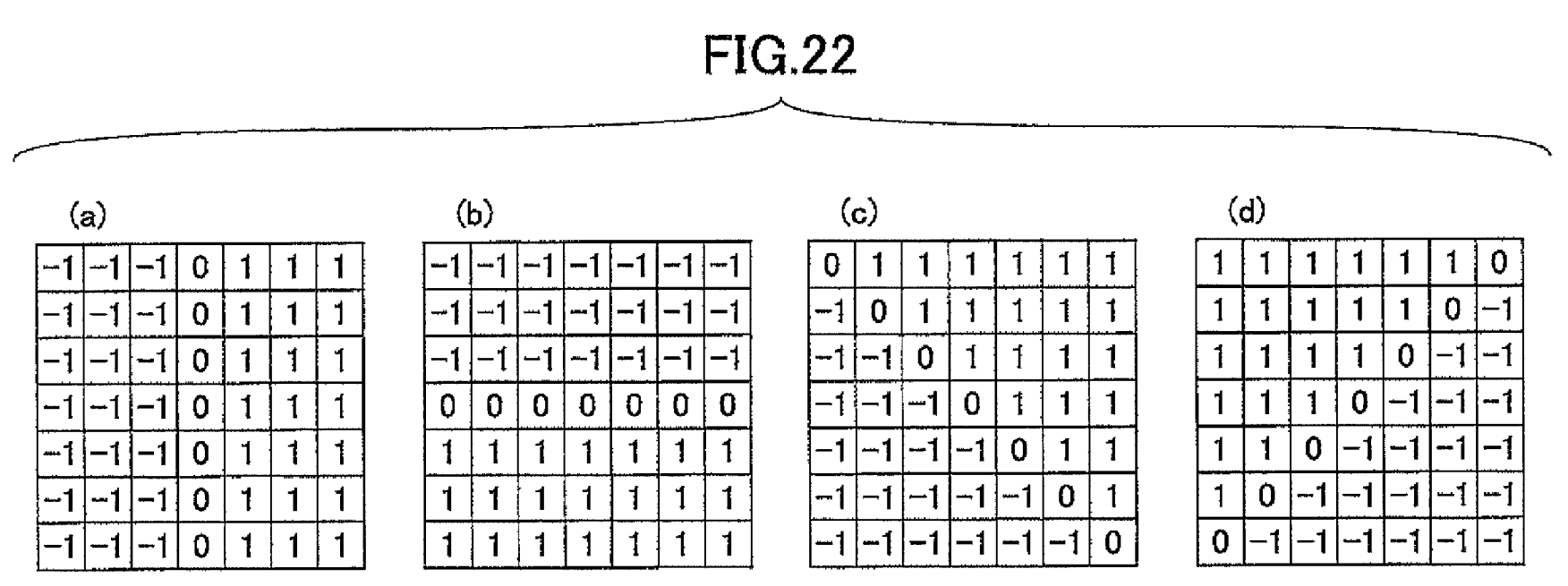

FIG. 21 is a block diagram illustrating the edge amount calculating part 132 according to an embodiment of the present invention. In this embodiment, the edge amount calculating part 132 includes four edge amount detecting filters 1300-1303. Each of the edge amount detecting filters 1300-1303 performs masking (masking operation) by using four types of 7×7 filters as illustrated in FIG. 22. Then, four absolute value outputting parts 1304-1307 output a signal including absolute values corresponding to the masking results of the edge amount detecting filters 1300-1303. Then, a maximum value selecting part 1308 selects a signal having a maximum absolute value from the signals output from the absolute value outputting parts 1304-1307. In this embodiment, the edge amount calculating part 132 includes three types of look-up table (LUT) parts 1339-1341 that have LUTs for performing LUT conversion on the selected signal. The LUT part 1339 has a character LUT used for outputting the edge amount of a character area, the LUT part 1340 has a halftone dot LUT used for outputting the edge amount of a halftone dot area, and the LUT part 1341 has a continuous tone LUT used for outputting the edge amount of a continuous tone. A selector 1342 selects one of the edge amounts (signals) output from the LUT parts 13339-1341 according to the determination results from the image area separating part 24 and outputs the selected edge amount as the edge amount output of the edge amount calculating part 132. In a case where the determination results from the image area separating part 24 indicates a black character on a white background or a color character on a white background, the selector 1342 selects the edge amount of the character LUT. In a case where the determination results from the image area separating part 24 indicate a halftone dot area, the selector 1342 selects the edge amount of the halftone dot LUT. In a case where the determination results from the image area separating part 24 indicate other areas, the selector 1342 selects the edge amount of the continuous tone LUT. Regardless of the determination results of the image area separating part 24, the selector 1342 selects the edge amount of the halftone dot LUT in a case where the document type is a (3) printed photograph and selects the edge amount of the continuous tone LUT in a case where the document type is a (4) photographic paper (in other words, cancels the switching selection of the edge amount corresponding to determination results of the image area separating part 24).

In a case where the document type is a (3) printed photograph, a smoothing filter is used for removing halftone dots (so that a moiré effect due to interference by the pseudo halftone process part 18 can be prevented) and the original image of the printed photograph is composited using a variable ratio with respect to an image having its edges enhanced according to the edge amount (so that the edges at a photograph part of the printed photograph do not become too blunt). In a case where the document type is a (4) photographic paper photograph, a weak smoothing filter is used for removing noise (in view of granularity improvement) and the original image of the photographic paper photograph is composited using a variable ratio with respect to an image having its edges enhanced according to the edge amount. In a case where the document type is a (1) character/photograph (printed photograph), a (2) character/photograph (photographic paper photograph), a (5) character, or a (6) map, a suitable smoothing filter and a suitable edge enhancing filter are used according to the determination results from the image area separating part 24.

In a case where the document type is a (7) low line-screen ruling document or a (8) newspaper, a smoothing filter (weaker than the smoothing filter used for a photographic paper photograph) is used for preventing noise without removing halftone dots and the original image of the low line-screen ruling document or the newspaper is composited using a fixed ratio with respect to an edge enhancing filter for slightly enhancing the edges that are smoothened by the smoothing filter. In the case where the document type is the (7) low line-screen ruling document, the filtering process is preferred to be performed on the entire image without removal of halftone dots in view of the difficulty of removing halftone dots while maintaining sharpness (clearness) of characters and the generation of undesired texture due to the relationship between the edge amount and the halftone dots partly smoothened according to the edge amount.

<Printer Color Correcting Part 14>

The printer color correcting part 14 converts R', G', B' signals that are independent from device characteristics to C' (Cyan), M' (Magenta), Y' (Yellow) signals corresponding to the toner colors of a printer (image forming apparatus) 19.

<Black Process Part 15>

The black process part 15 generates K (black) signals in correspondence with the C', M', Y' signals. The black process part 15 also reduces the amount of C', M', Y' that would have added to K and replaces them with K (Under Color Removal, UCR). Although generation of black and UCR can both be performed by using an LUT or a formula, this embodiment uses a LUT for generating black signals and uses the below-described formula for performing UCR.

Figure 23:
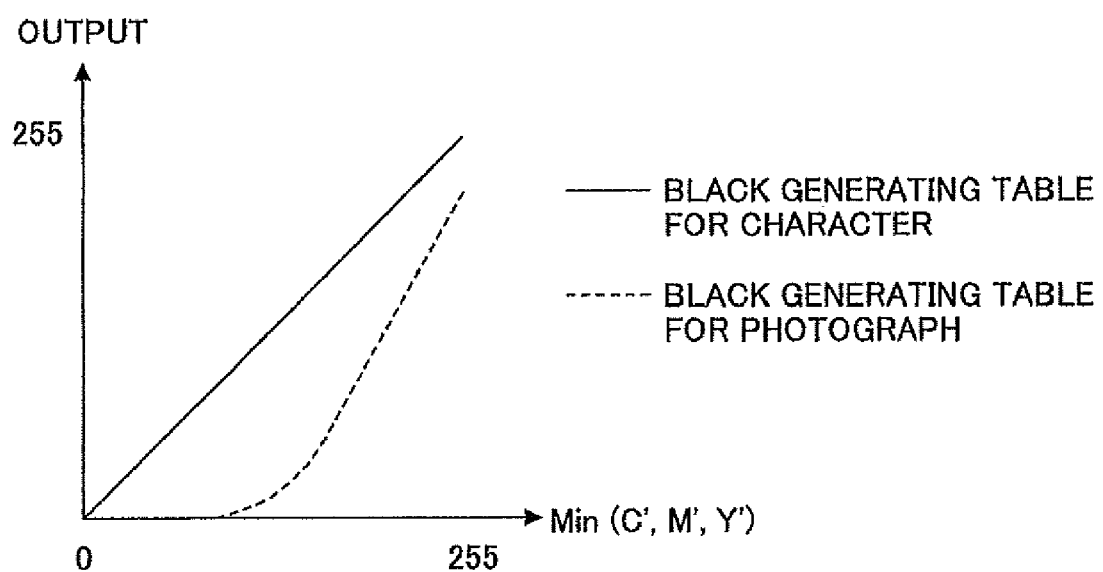
FIG. 23 illustrates an example of a LUT (look-up table) used by a black process part for performing a black generation process.

FIG. 23 illustrates an example of LUT used by the black process part 15 for performing a black generation process. The black process part 15 calculates a minimum value Min of C', M', Y' ("0" representing white, "255" representing black) and inputs the calculated value to the LUT, to thereby generate a black signal. In this embodiment, two LUT tables are used where one LUT is used for generating black for black characters (black character table) and the other LUT is used for generating black for color characters/photographs (color character/photograph table).

With reference to the table illustrated in FIG. 9, in a case of generating black signals according to the determination results from the image area separating part 24, the black process part 15 uses the black character table with respect to an area determined to include a black character on a white background and uses the color character/photograph table with respect to an area determined to include a color character on a white background or other areas. Further, the black process part 15 uses the black character table with respect to an area determined to include (5) characters or a (6) map. This is because importance is placed on the quality of black characters on a color background for an image including (5) characters or a (6) map. Thus, by increasing the proportion of black, black can be clearly reproduced even in a case where, for example, a printing plate is displaced when outputting an image. Further, the black process part 15 uses the black character table with respect to an area determined to include a (7) low line-screen ruling area or a (8) newspaper area. This is because importance is placed on the quality of black characters on a color background and also because of the following reason. Generally, in a case where the document type is a photograph (particularly, a highlighted area of the photograph), granularity is degraded when the proportion of black is increased. Therefore, a relatively small proportion of black is generated to prevent such degradation. In a case where the document type is a low line-screen ruling area document (particularly, a newspaper document), the document initially has a substantial granularity and is relatively unnecessary to better the granularity in a case of duplicating (copying) the image. Hence, the black process part 15 uses the black character table with respect to an area determined to include a (7) low line-screen ruling area or a (8) newspaper area.

The black process part 15 performs UCR by using the following [Formula 3].

$$C = C' - \alpha \times K$$

$$M = M' - \alpha \times K$$

$$Y = Y' - \alpha \times K$$

[Formula 3]

The black process part 15 switches the parameters used for performing UCR. For example, "α=1" in [Formula 3] with respect to an area with the black character table applied, and "α=0.5" in [Formula 3] with respect to an area with the color character/photograph table applied.

<Edge Detecting Part 20>

Figure 24:
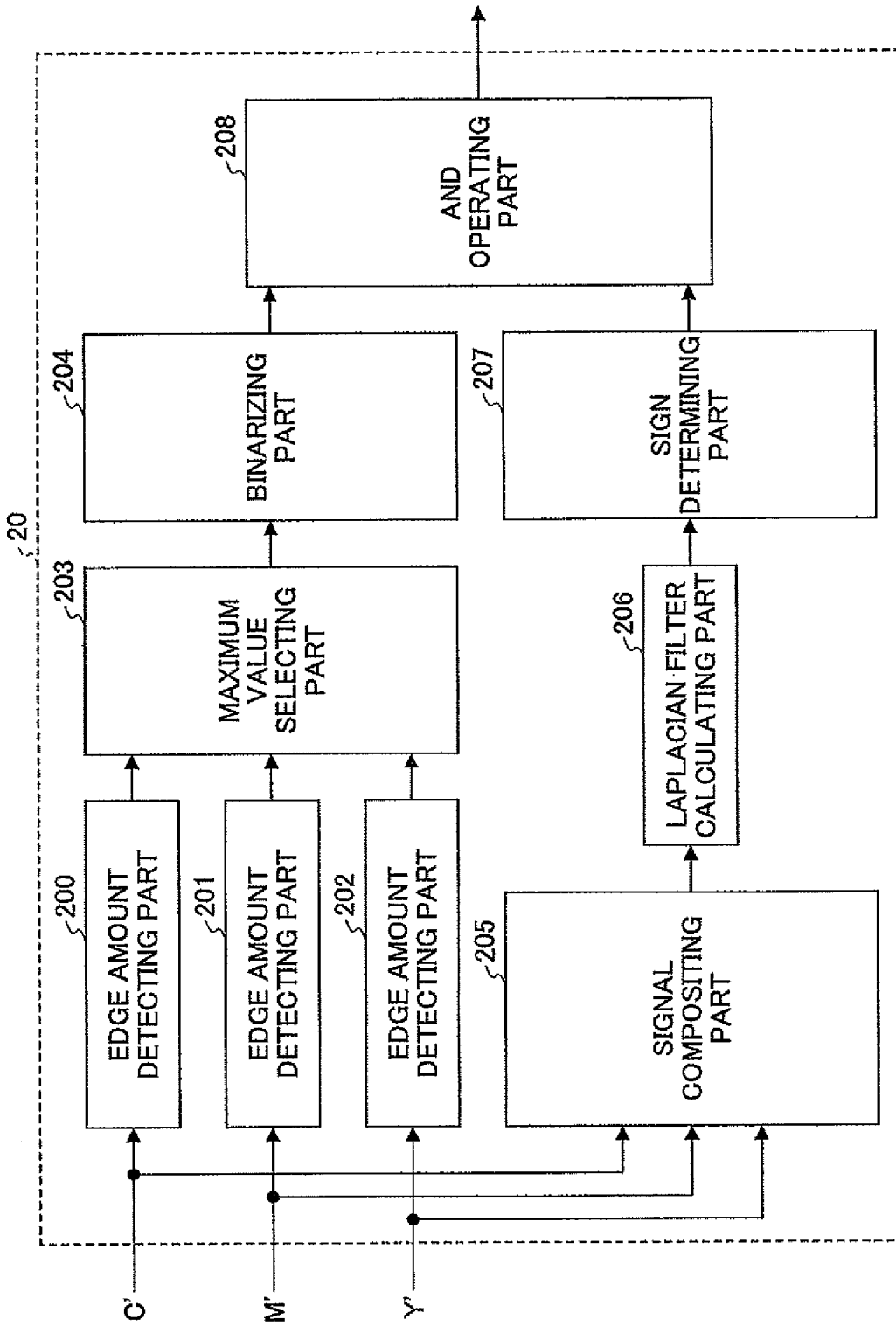
FIG. 24 is a block diagram illustrating an edge detecting part according to an embodiment of the present invention.
Figure 25:
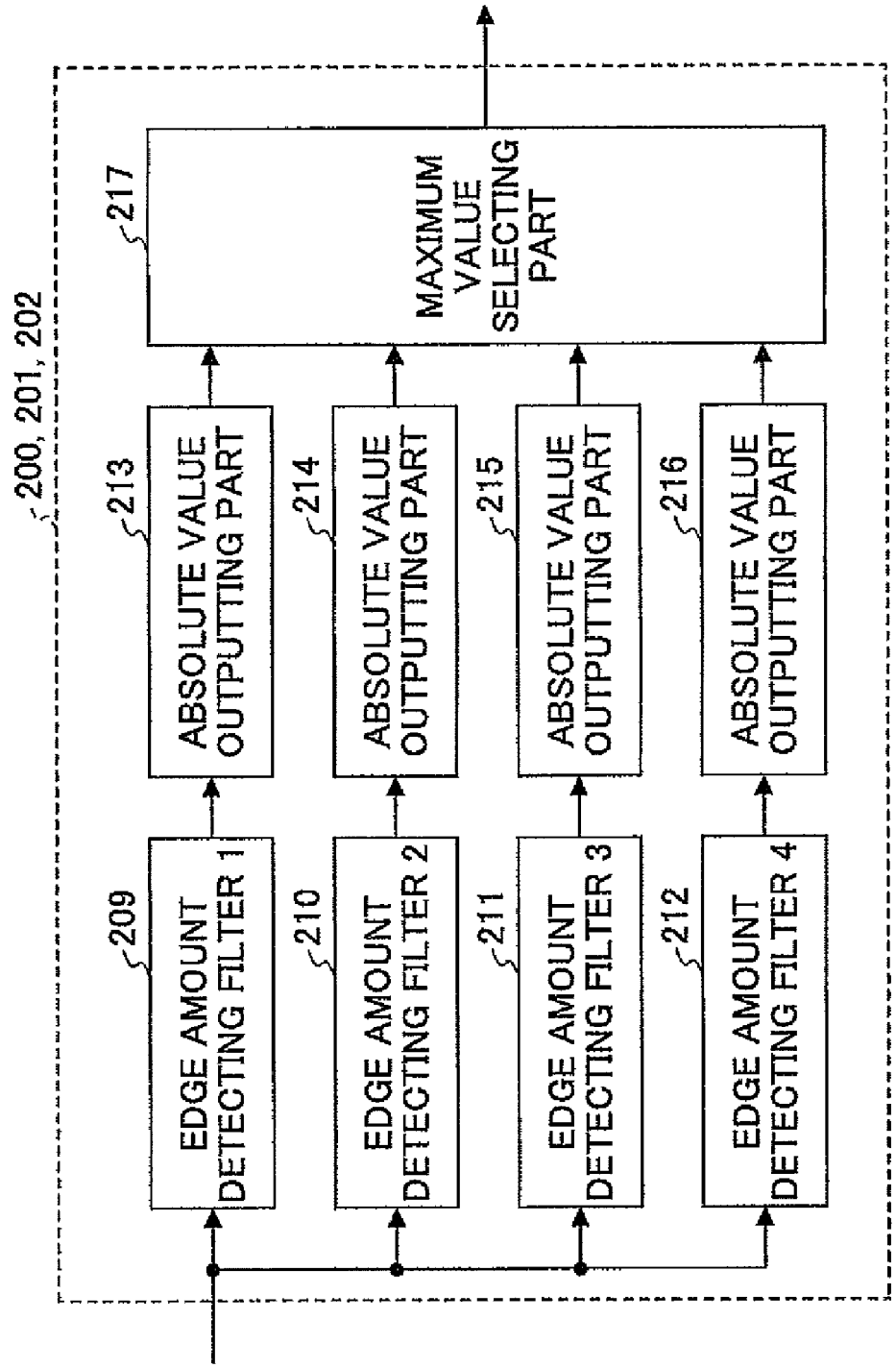
FIG. 25 is a block diagram illustrating a configuration of an edge detecting portions according to an embodiment of the present invention.
Figure 26:
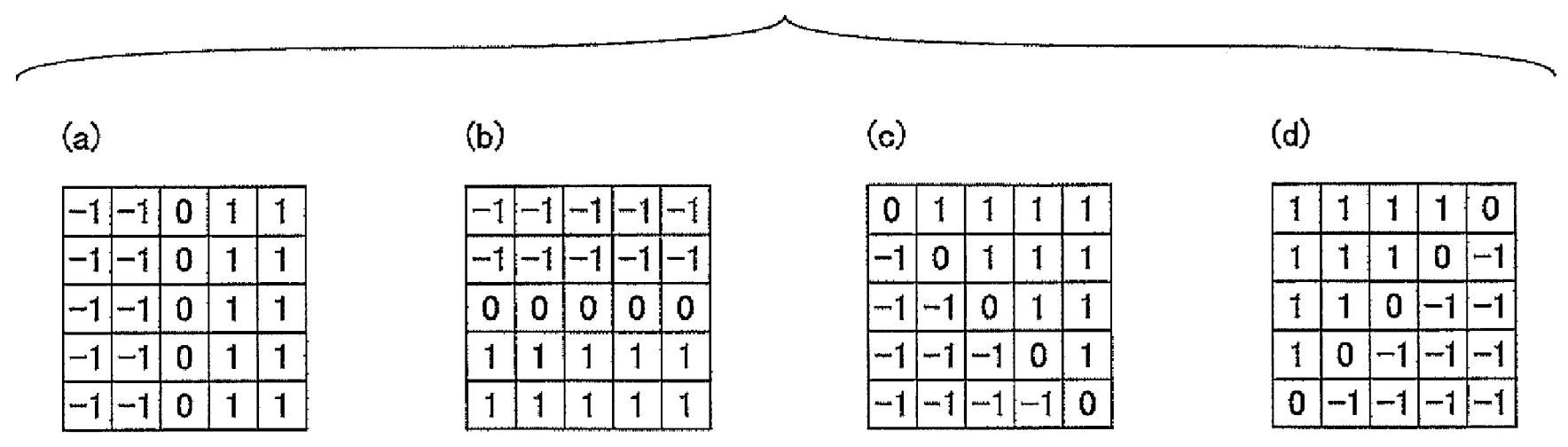

FIG. 24 is a block diagram illustrating the edge detecting part 20 according to an embodiment of the present invention. The edge detecting part 20 includes a C' edge detecting portion 200, a M' edge detecting portion 201, and a Y' edge detecting portion 202 for detecting multiple valued edge amounts corresponding to the colors C, M, Y, respectively. FIG. 25 is a block diagram illustrating a configuration of the edge detecting portions 200, 201, 202 according to an embodiment of the present invention. In this embodiment, each of the edge detecting portions 200, 201, 202 includes four edge amount detecting filters 209-212. Each of the filters 209-212 performs masking (masking operation) by using four types of 5×5 filters as illustrated in FIG. 26. Then, four absolute value outputting parts 213-216 output a signal including absolute values corresponding to the masking results of the filters 209-212. Then, a maximum value selecting part 217 selects a signal having a maximum absolute value from the signals output from the absolute value outputting parts 213-216 and outputs the selected signal.

Then, a maximum selecting part 203 of the edge detecting part 20 selects a signal having the maximum edge amount from one of the three outputs of the edge detecting portions 200, 201, 202. Then, a binarizing part 204 compares the maximum edge amount of the signal selected by the maximum selecting part 203 with a predetermined threshold. In a case where the maximum edge amount is no less than the threshold, the binarizing part 204 outputs "1". In a case where the maximum edge amount is less than the threshold, the binarizing part 204 outputs "0".

Figure 27:
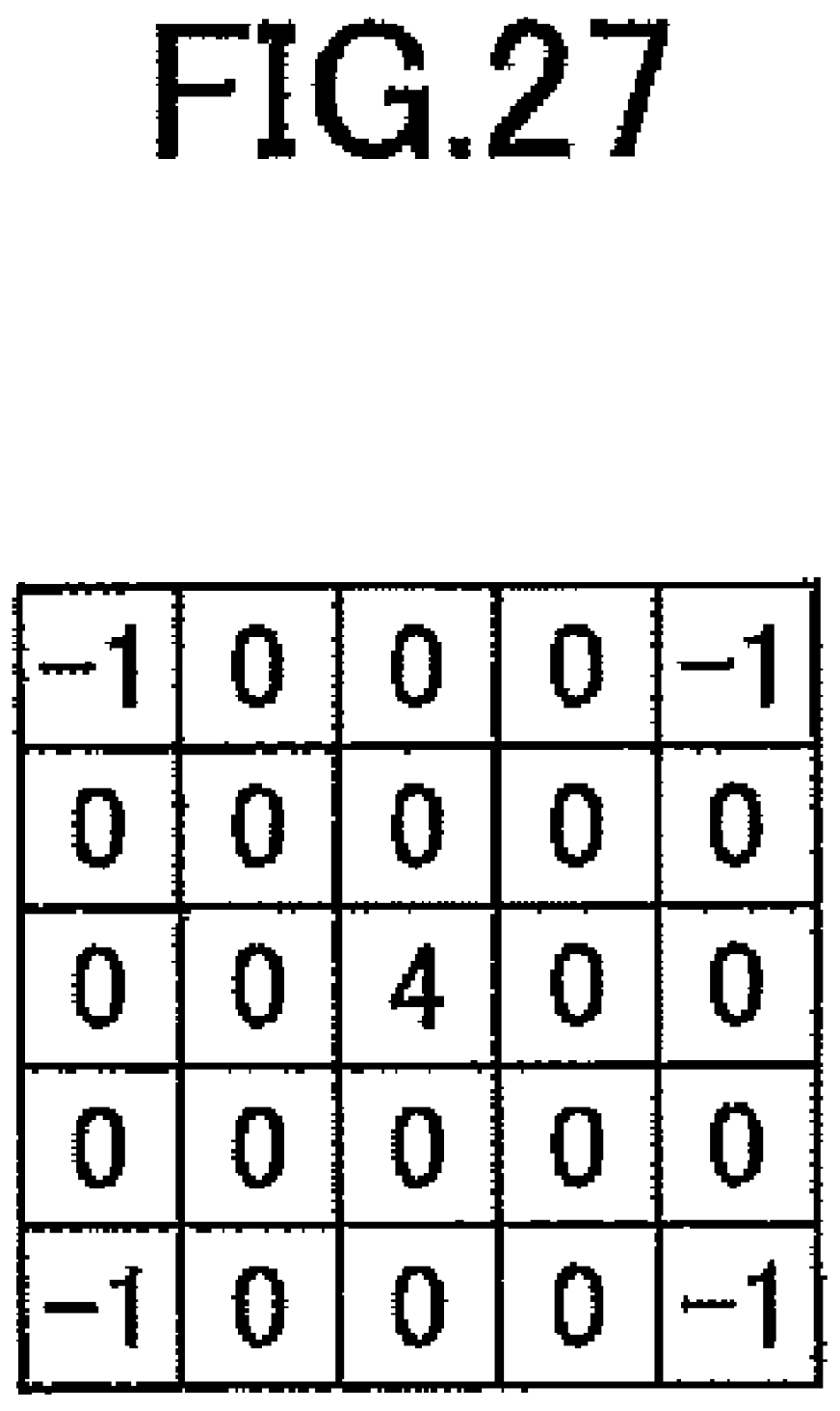

A signal compositing part 205 of the edge detecting part 20 converts the three C', M', Y' signals into a single composite signal by adding together a predetermined proportion of the three C', M', Y' signals. For example, the signal compositing part 205 outputs a composite signal of (C'×¼+M'×²⁄₄+Y'×¼). A Laplacian filter calculating part 206 performs masking on the composite signal by using a filter illustrated in FIG. 27. Then, a sign determining part 207 determines whether the sign of the masking value calculated by the Laplacian filter calculating part 206 is a positive sign or a negative sign. The sign determining part 207 outputs "1" when the sign of the masking value is a positive sign and outputs "0" when the sign of the masking value is a negative sign. Then, an AND operating part 208 reports detection of an edge by outputting "1" when both the output of the binarizing part 204 and the output of sign determining part 207 are "1".

Figure 28:
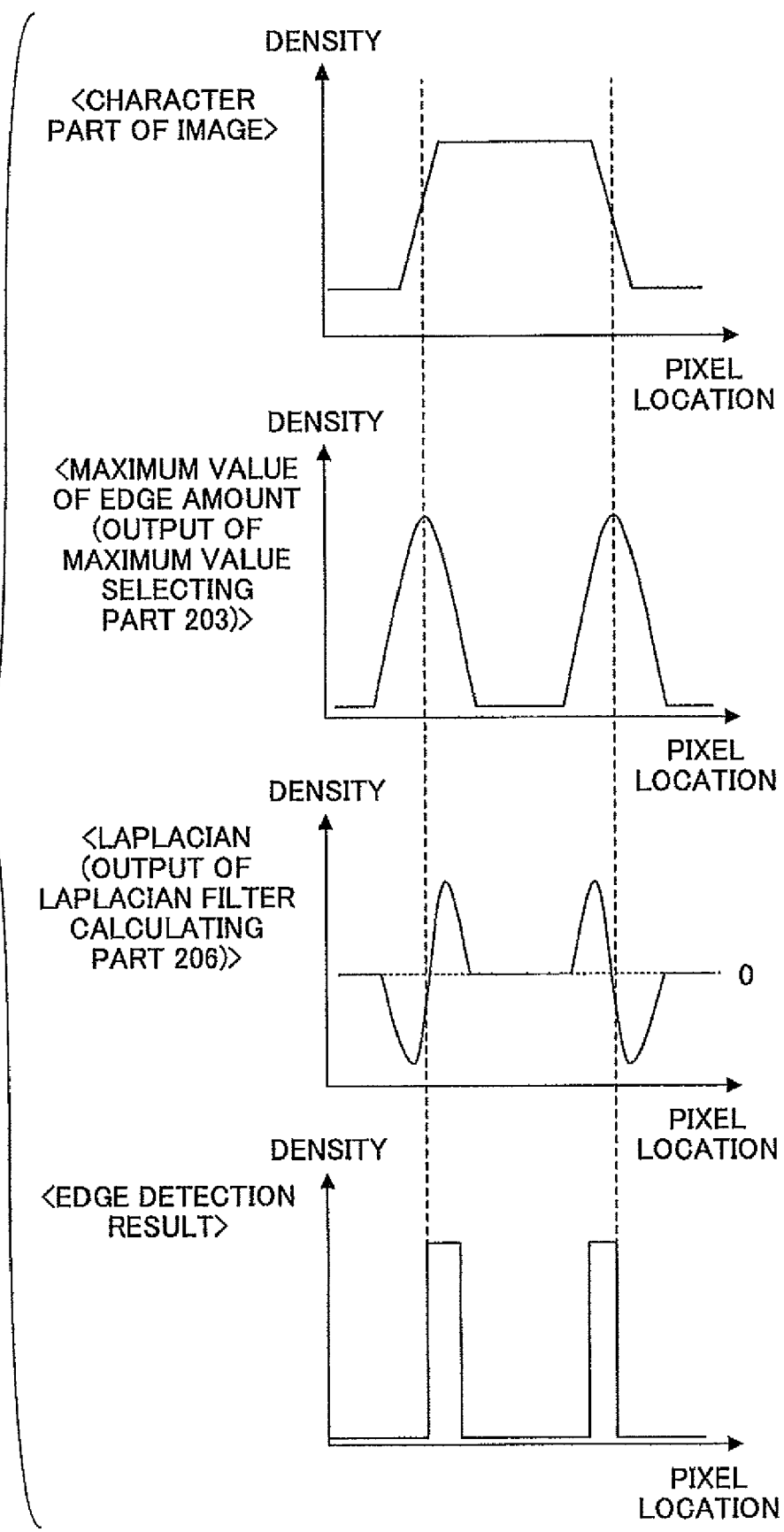
FIG. 28 is a schematic diagram for describing detection results of an edge detecting part where an original image includes an edge of a character.

FIG. 28 is a schematic diagram for describing detection results of the edge detecting part 20 where the original image includes an edge of a character. The edge detecting part 20 responds at an edge part of the character and outputs a positive value. The Laplacian filter calculating part 206 outputs a positive value with respect to a high density side of the edge (corresponding to an inner edge) and outputs a negative value with respect to a low density side of the edge (corresponding to an outer edge). Because the edge detecting part 20 is provided with the sign determining part 207, the edge amount is valid only when the Laplacian filter calculating part 206 outputs a positive value indicating the inner edge of the character and is invalid when the Laplacian filter calculating part 206 outputs a negative value indicating the outer edge of the character. Thus, the inner edge is detected as the edge of the character.

<Color Material Saving Process Part 16>

Figure 29:
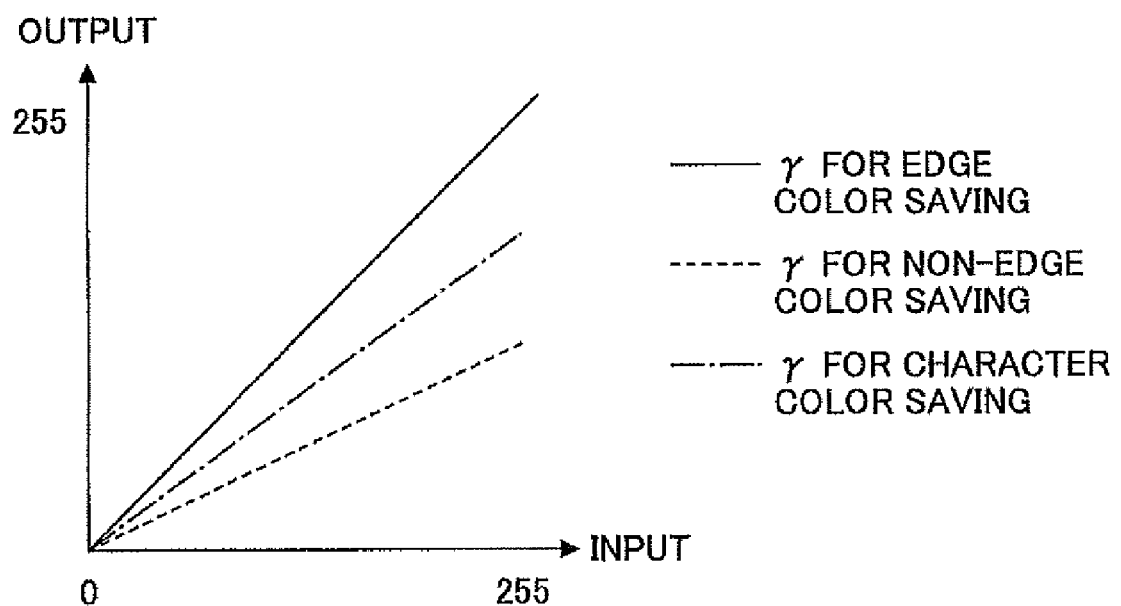
FIG. 29 is a graph illustrating γ conversion of various color material saving processes performed by a color material saving process part according to an embodiment of the present invention.

In a case where the user turns on a color saving mode by using the control panel 23, the color material saving process part 16 switches between various color material saving processes according to the determination results from the document type determining part 25 and the detection results from the edge detecting part 20. FIG. 29 is a graph illustrating γ conversion of the various color material saving processes switched by the color material saving process part 16 according to an embodiment of the present invention.

In a case where the document type is a (1) character/photograph (printed photograph), a (2) character/photograph (photographic paper photograph) or a (6) map, the edge parts of an original image in the document are enhanced according to the detection results from the edge detecting part 20 by applying an edge color saving γ (γ applied to edge parts of an original image during a color material saving process) to edge parts of an original image and a non-edge color saving γ (γ applied to non-edge parts of an original image during a color material saving process) to non-edge parts of an original image. Accordingly, substantially no color material saving process is performed on the edge parts of the document by applying the edge color saving γ whereas the density values of the non-edge parts of an output image at the non-edge parts becomes substantially half of the density values of the non-edge parts of a corresponding input image.

In a case where the document type is a (3) printed photograph or a (4) photographic paper photograph, the non-edge color saving γ is applied to the entire original image regardless of the detection results from the edge detecting part 20.

In a case where the document type is a (5) character document, a (7) low line-screen ruling document, or a (8) newspaper document, a character color saving γ (γ applied to a character part of an original image during a color material saving process) is applied to the entire original image regardless of the detection results from the edge detecting part 20 (hereinafter also referred to as "second color material saving process"). If a color material saving process dependent on the detection results from the edge detecting part 20 (hereinafter also referred to as "edge dependent type color material saving process" or "first color material saving process") is performed on the (5) character document in which the edge color saving γ is applied to the edge parts of the character while the non-edge color saving γ is applied to the non-edge parts of the character, the resultant character would be a bold character having its edge parts densely reproduced while its inner parts are thinly reproduced. Although the resultant character is legible, the quality of the character is relatively poor. Therefore, the character color saving γ, which is independent from the detection results of the edge detection part 20, is applied to the entire original image of the character document so that the entire original image can be uniformly sparsely reproduced. In order to prevent the character of the character document from being illegible due to the entire original image becoming too sparse, an intermediate γ between the edge color saving γ and the non-edge color saving γ may be used when the document type is the (5) character document (hereinafter also referred to as "third color material saving process"). Thereby, legibility of the character can be maintained while attaining a color material saving effect.

In a case where the document type is a (7) low line-screen ruling document or a (8) newspaper document, the edge detecting part 20 may in some cases detect a large edge amount in an area having halftone dots having a halftone dot ratio of approximately 50% and determine that the area is an edge while not determining an area having high density halftone dots as an edge.

For example, in a case of scanning a photograph image formed of high line-screen ruling with the scanner 10 having a resolution of 600 dpi×600 dpi, halftone dots of the photograph image read out by the scanner 10 may be blurred due to the ability of the scanner 10. Further, any irregularity of the halftone dots can be relatively removed while maintaining a substantially clear sharpness of a character in the photograph image by performing a typical filtering process. Accordingly, the high line-screen ruling area of the photograph image is prevented from being determined as an edge by the edge detecting part 20. On the other hand, in a case of scanning a photograph image formed of low line-screen ruling with the scanner 10, halftone dots of the photograph image read out by the scanner 10 are hardly affected by the ability of the scanner 10. Further, any irregularity of the halftone dots cannot be removed by performing a typical filtering process in view of attaining a clear sharpness of a character in the photograph image. Accordingly, there is a risk of the halftone dots being determined as edge parts by the edge detecting part 20. Further, halftone dots determined as edge parts are limited to low line-screen ruling having a halftone dot ratio of approximately 50%. It is apparent that a line-screen ruling area having a halftone dot ratio of 0% or 100% is not determined as an edge part because halftone dots of such line-screen ruling have no irregularity. Thus, any irregularity of the halftone dots becomes more difficult to detect and the halftone dot areas become more difficult to be determined as edge parts as the halftone dot ratio transfers from 50% to 0% or from 50% to 100%. In other words, in an image formed of low line-screen ruling, halftone dot areas are determined as edge parts when the halftone dot ratio is approximately 50% and the halftone dot areas maintain their density without being subject to a color material saving process. On the other hand, it becomes more difficult to determine halftone dot areas of the photographic image having a low line-screen ruling as edge parts as the halftone dot ratio becomes closer towards 100%. Thus, the halftone dot areas of the photographic image having a low line-screen ruling are subject to a color material saving process. Accordingly, an image with a reduced density is output. As a result, gradation inversion occurs.

Figure 30A:
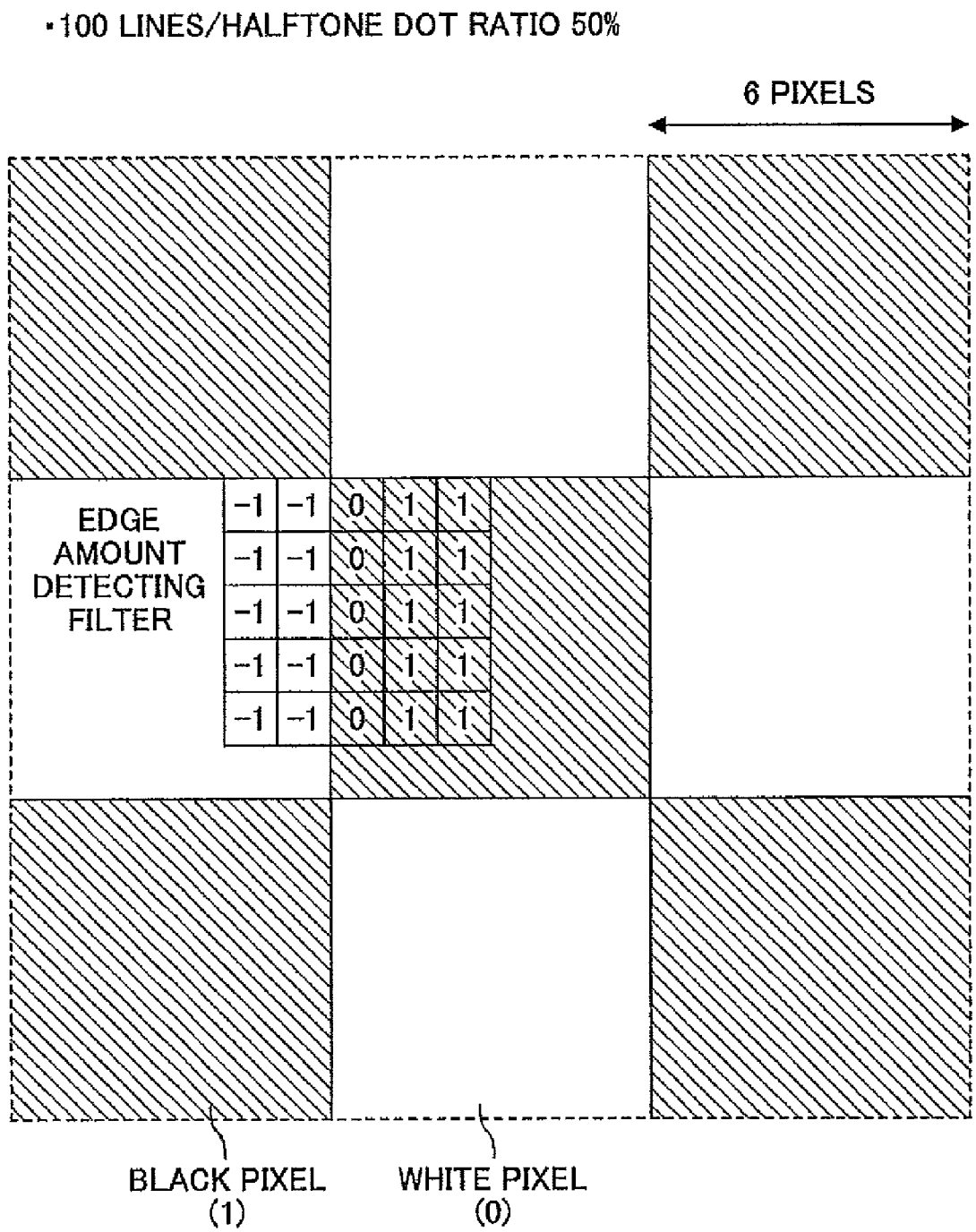
FIGS. 30A and 30B are schematic diagrams for explaining results of performing an edge detecting process on a low line-screen ruling image with the edge detecting part after masking with a filter and outputting an absolute value according to the masking result of the filter.
Figure 30B:
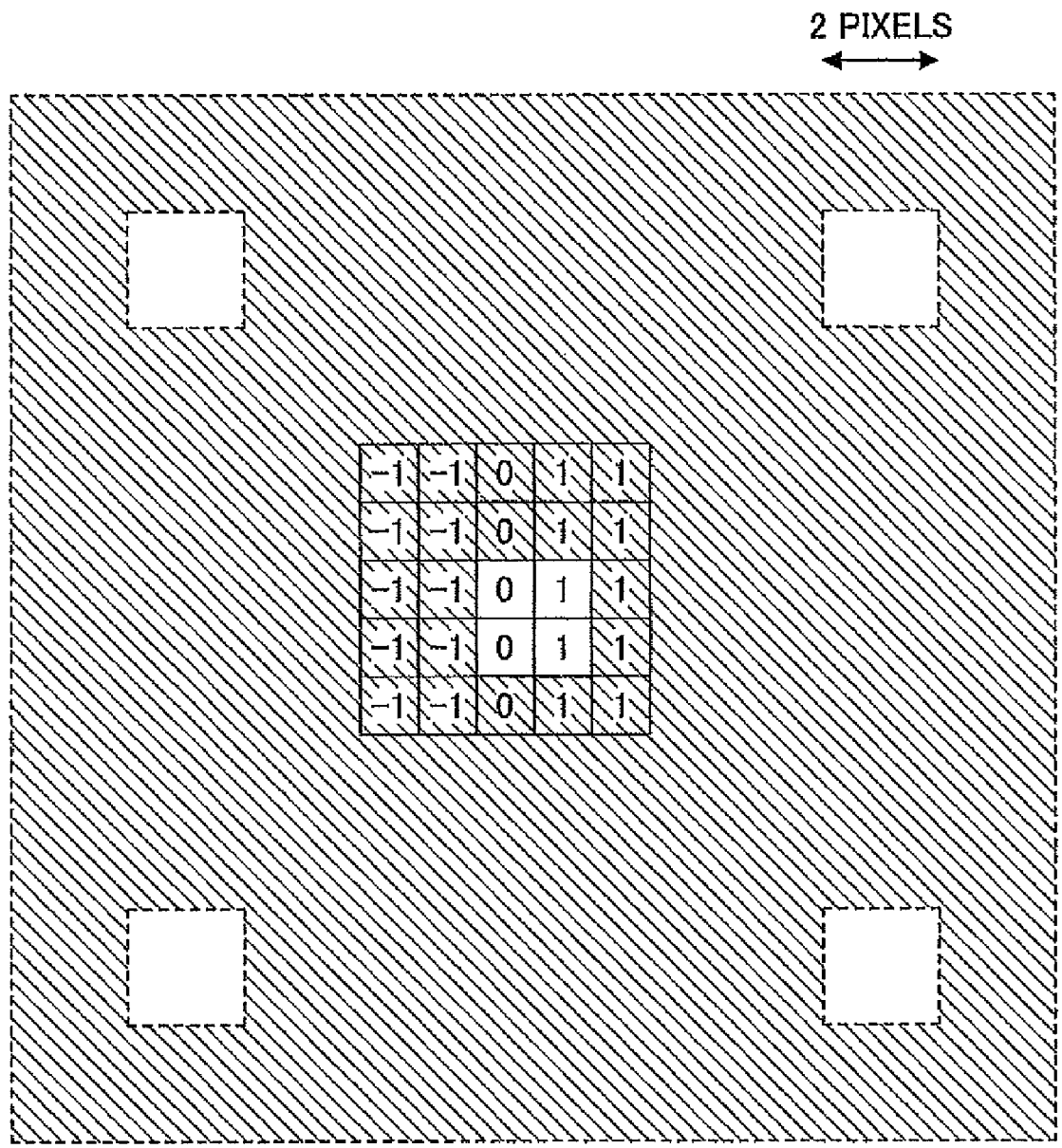

FIGS. 30A and 30B are schematic diagrams for explaining results of performing an edge detecting process on a low line-screen ruling image with the edge detecting part 20 after masking with the filter 209 and outputting an absolute value according to the masking result of the filter 209. For the sake of simplifying the explanation, the low line-screen image is a binary image in which "1" represents a black pixel and "0" represents a white pixel. In a case where the image has 600 dpi and a halftone dot ratio of 50%, the edge amount subsequent to outputting an absolute value with respect to a target pixel located at a border between a white pixel and a black pixel becomes 10 (see FIG. 30A). In a case where the halftone dot ratio is 94%, the edge amount subsequent to outputting an absolute value with respect to the target pixel becomes 2 (see FIG. 30B) Then, the binarizing part 204 binarizes the edge amount by comparing the edge amount with a threshold of 5, for example. Accordingly, an edge part(s) is detected in an area having a halftone dot ratio of 50% whereas no edge part(s) is detected in an area having a halftone dot ratio of 94%. In a case where the color material saving process part 16 performs the edge dependent type color material saving process, the edge color saving γ is applied to an area having a halftone dot ratio of 50% so that the density of the 50% halftone dot ratio area is maintained whereas the non-edge color saving γ is applied to an area having a halftone dot ratio of 94% so that the density of the 94% halftone dot ratio area is not maintained. As a result, gradation inversion occurs. Accordingly, in order to prevent the gradation inversion, the color material saving process part 16 performs a color material saving process by thinning the entire image without using edge determination results and applying the character color saving γ to the entire image for attaining legibility of a character of the original image.

<Printer γ Correcting Part 17, Pseudo Halftone Process Part 18>

The printer γ correcting part 17 performs a density converting process by using a density converting table in accordance with density characteristics of the printer 19. The pseudo halftone process part 18 performs a pseudo halftone process (e.g., dithering, error diffusion) on corrected results output from the printer γ correcting part 17. In a case where the pseudo halftone process part 18 performs a dithering process, the pseudo halftone process part 18 switches the number of dither lines according to the document type and the determination results of the image area separating part 24. In a case where the printer 19 has an output resolution of 600 dpi, a 300 line dither is used for dithering a character (character dither) and a 200 line dither is used for dithering a photograph (photograph dither). The printer γ correcting part 17 includes a printer γ correction table used for a character (character printer γ correction table) and another printer γ correction table used for a photograph (photograph printer γ correction table). The printer γ correcting part 17 switches the use of the printer γ correction tables depending on, for example, a character or a photograph. For example, as illustrated in FIG. 9, the printer γ correcting table is applied according to the document type or the determination results from the image area separating part 24 in a case of "according to separation". The character photograph printer γ correction table is used with respect to a black character white background area or a color character white background area. The photograph dither and the photograph printer γ correcting table may be applied to other areas.

Hence, the above-described embodiment of the image processing apparatus 1000 can apply an optimum color material saving process according to original image data corresponding to the document type selected from the control panel 23 and determination results from the automatic document type determining part 22.

More specifically, by uniformly applying a reduced amount of color material for forming an original image including a low line-screen ruling area (second color material saving process), gradation inversion due to performing edge part enhancement (first color material saving process) on the low line-screen ruling area can be prevented. Thus, degradation of image quality due to performing a color material saving process can be controlled within a permissible range.

Meanwhile, in a case of an original image that does not include a low line-screen, edge part enhancement (first color material saving process) is performed on the entire original image. Therefore, even where an original image has a photograph image in the background of a character image, degradation of legibility of the character image can be prevented by performing the edge part enhancement (first color material saving process) on the character image. Further, since the photograph image in the background of the character image is not a low line-screen ruling area, degradation of image quality can be controlled within a permissible range even if the edge part enhancement (first color material saving process) is performed on the photograph image.

Accordingly, with the above-described embodiment of the image processing apparatus 1000, degradation of image quality due to performing a color material saving process can be controlled within a permissible range while preventing degradation of character legibility of an original image having a photograph image formed in the background of a character image.

Further, in forming an original image that only includes a character image, the third color material saving process may be performed which also uniformly applies a reduced amount of color material. In order to prevent degradation of legibility of a character image, the reduced amount of color material applied to non-edge parts in the third color material saving process is less than the reduced amount of color material applied to non-edge parts in the first color material saving process. Although the above-embodiment describes both the second and third color material saving processes as uniformly (evenly) reducing the color for an entire image by applying the character color saving γ to the entire image, the second and third color material saving processes may apply different color savings γ. The second color material saving process can apply other color savings γ as long as a reduced amount of color material can be uniformly applied to an entire image. The third color material saving process can also apply other color saving γ as long as character legibility can be attained by using lesser amount of reduced color material than the amount of reduced color material applied to non-edge parts by the first color material saving process.

<Second Embodiment>

In the image processing apparatus according to the first embodiment, a color material saving process (second or third color material saving process) is performed by applying a character color saving γ to an entire image regardless of whether the image includes an edge area or a non-edge area when the user selects a <5> newspaper document from the control panel 23 or when the user selects <automatic> or a <1> character/photograph (<1-1> printed photograph) along with the automatic document type determining part 22 determining that the document type is a [4] low line-screen ruling document. As described above, the second and third color material saving process is used for preventing gradation inversion due to performing the first color material saving process. However, gradation inversion does not always occur even where the first color material saving process is used for a newspaper document or other documents including low line-screen ruling. The gradation inversion tends to occur when a low line-screen ruling area having a halftone dot ratio of approximately 50% (approximately 40%-60%) and a high density area having a halftone dot ratio greater than that of the low line-screen ruling area (60%-100%) exist in the same document. For example, although a hatching area depicted in the background of a character corresponds to a low line-screen ruling area, the first color material saving process may be performed for attaining greater legibility of the character without encountering gradation inversion on condition that no high density area exists in the same document. Further, even if a hatching area depicted in the background of a character corresponds to low line-screen ruling area having a halftone dot ratio of approximately 50% and a high density area exists in the same document as the low line-screen area, the high density area may be a white background part of an outline character. Thus, even if there is gradation inversion between a white background part of an outline image and a halftone dot part of a black character background, the gradation inversion would not significantly affect image quality. The area which may cause a problem in image quality is a low line-screen photograph area having continuous areas with changing density. Thus, even if a low line-screen area is included in an original image, gradation inversion would not significantly affect image quality in a case where the original image exhibits little change of tone (e.g., graph, figure).

In view of the above, an image processing apparatus according to a second embodiment of the present invention is described as follows. In the second embodiment, like components are denoted by like reference numerals as of the first embodiment and are not further explained.

When the user selects a <5> newspaper document from the control panel 23' as the document type or when the user selects <automatic> or <1> character/photograph (<1-1> printed photograph) as the document type along with the automatic document type determining part 22 determining that the document type is a [4] low line-screen ruling document, the image processing apparatus 1000 queries the user whether a photograph is included in the document via the control panel 23'. In response to the query, the user selects a response indicating whether the document includes a photograph. In a case where a photograph is included in the document, the image processing apparatus 1000 performs, in the same manner as the first embodiment, the second color material saving process in which the character color saving γ is applied to the entire image regardless of whether edge parts are detected, so that a reduced amount of color material is uniformly applied for forming the image obtained from the document. On the other hand, the first color material saving process is performed for enhancing edge parts in a case where a photograph is not included in the document.

With the image processing apparatus 1000 according to the second embodiment, even in a case where the document is a newspaper document or a document including low line-screen ruling, an image can be formed with a reduced amount of color material without encountering gradation inversion by performing the second color material saving process instead of the first color material saving process only when the document includes a photograph area. Thus, in a case where the document is a newspaper document without a photograph part, the first color material saving process can be performed for attaining satisfactory character legibility.

<Third Embodiment>

Next, an image processing apparatus 1000 according to a third embodiment of the present invention is described. Because the image processing apparatus 1000 of the second embodiment has a procedure of querying the user whether a photograph is included in the document via the control panel 23', this procedure may be troublesome for the user. The below-described embodiment of the image processing apparatus 1000 is configured taking this aspect into consideration. In the third embodiment, like components are denoted by like reference numerals as of the first embodiment and are not further explained.

The image processing apparatus 1000 according to the third embodiment includes a preliminary processing portion 16' provided in the color material saving process part 16 for preliminarily performing the first color material saving process regardless of the type of the document and a gradation inversion determining part 30 for determining whether gradation inversion will occur (gradation inversion possibility) if the preliminary processing portion 16' performs the first color material saving process when the user selects a <5> newspaper document from the control panel 23 as the document type or when the user selects <automatic> or <1> character/photograph (<1-1> printed photograph) as the document type along with the automatic document type determining part 22 determining that the document type is a [4] low line-screen ruling document. In a case where the gradation inversion determining part 30 determines that there is a possibility of gradation inversion, the second color material saving process is performed. In a case where the gradation inversion determining part 30 determines there is no possibility of gradation inversion, the first color material saving process is performed.

Figure 31:
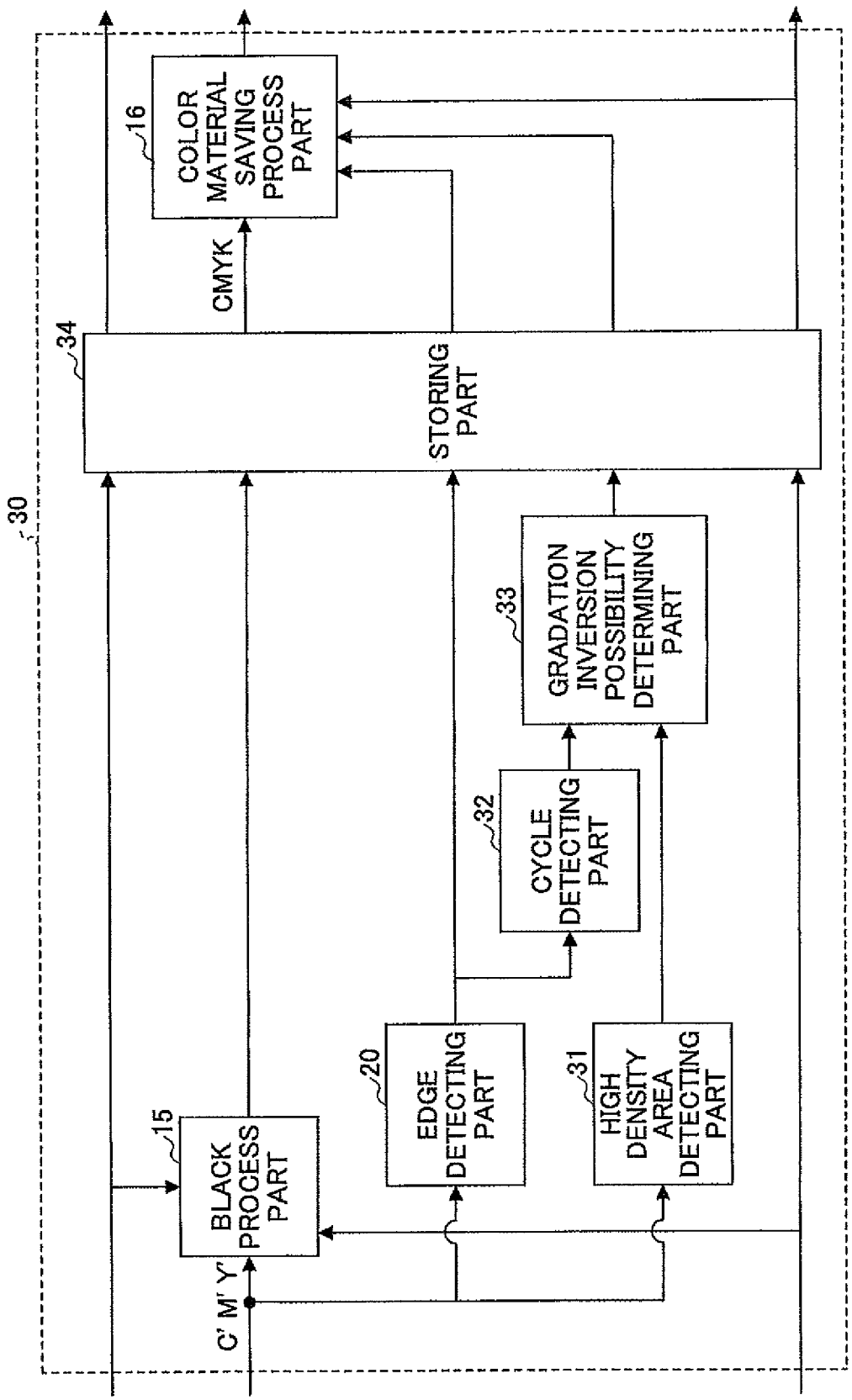
FIG. 31 is a schematic diagram illustrating an exemplary configuration of a gradation inversion determining part according to an embodiment of the present invention.

FIG. 31 is a schematic diagram illustrating an exemplary configuration of the gradation inversion determining part 30. This configuration basically corresponds to the dotted line part illustrated in FIG. 1.

In the gradation inversion determining part 30 of FIG. 31, a high density area detecting part 31 obtains an average value of 25×25 pixels corresponding to C', M', Y' signals and determines that a high density area exists in the original image when the average value of any one of the signals is no less than a predetermined threshold. In this example, the threshold is set so that the border of determining existence of a high density area is a halftone ratio of approximately 60%. A cycle detecting part 32 performs a DCT transformation in the same manner as the low line-screen ruling area determining part 222 of the automatic document type determining part 22.

Figure 32:
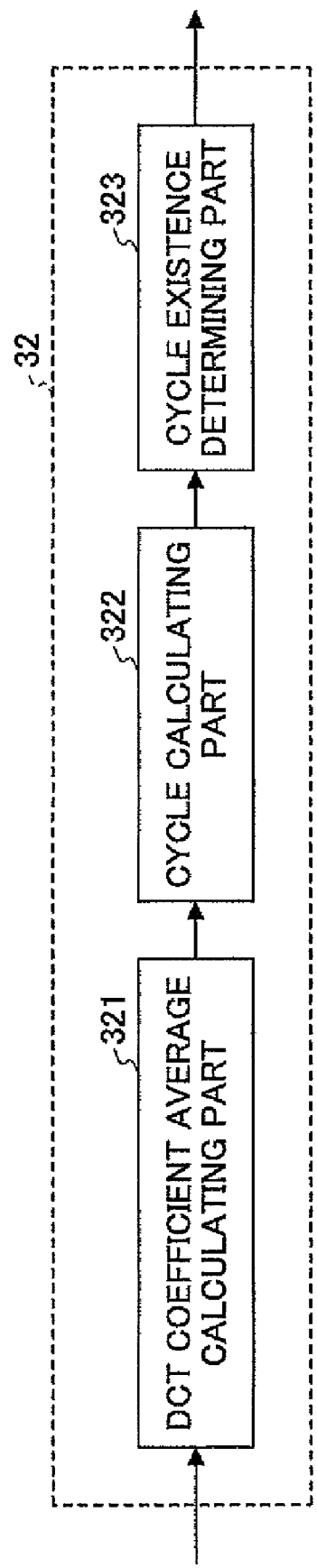
FIG. 32 is a block diagram illustrating a cycle detecting part according to an embodiment of the present invention.

FIG. 32 is a block diagram illustrating a cycle detecting part 32 included in the gradation inversion determining part 30 according to an embodiment of the present invention. The cycle detecting part 32 includes a DCT coefficient average calculating part 321 and a cycle calculating part 322 which are basically configured the same as those of the low line-screen ruling area determining part 222. A cycle existence determining part 323 also included in the cycle detecting part 32 obtains a peak from the calculation results from the cycle calculating part 322 and determines that a cycle exists in the edge detection results from the edge detecting part 20 when a maximum value M of the peak is no less than a predetermined value. Returning to FIG. 31, a gradation inversion determining part 33 determines that there is a possibility of gradation inversion when both a cycle and a high density area are determined to exist by the high density area detecting part 31 and the cycle detecting part 32, respectively. When both the cycle and the high density area are determined not to exist, the gradation inversion determining part 33 determines there is no possibility of gradation inversion. The gradation inversion determining part 30 also includes a storing part 34 for temporarily storing the determination results of the gradation inversion determining part 33.

With the image processing apparatus 1000 of the third embodiment, even in a case where the document is a newspaper document or a document including low line-screen ruling, an image can be formed with a reduced amount of color material without encountering gradation inversion by performing the second color material saving process instead of the first color material saving process only when the document includes a photograph area. Thus, in a case where the document is a newspaper document without a photograph part, the first color material saving process can be performed for attaining satisfactory character legibility. In addition, the burden of the user can be reduced since the possibility of gradation inversion can be automatically determined.

<Fourth Embodiment>

Next, an image processing apparatus 1000 according to a fourth embodiment of the present invention is described.

Figure 33:
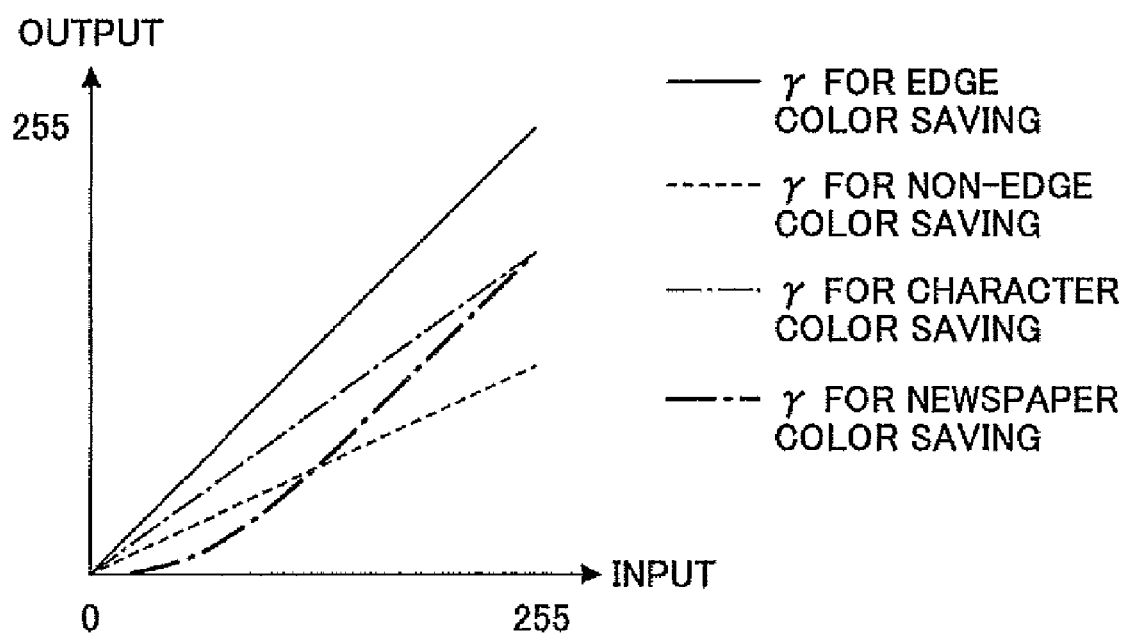
FIG. 33 is a graph illustrating newspaper color saving γ added to the other γ used by the color material saving process part according to an embodiment of the present invention.

With the image processing apparatus 1000 according to the fourth embodiment, when the document type is a (8) newspaper document, blank areas of a newspaper (which usually have a higher density than blank areas of paper used for copying) can be converted to white and allow color material to be saved by applying a newspaper color saving $\gamma$ ($\gamma$ applied to blank areas of an original image during a color material saving process) to blank areas of an original image. FIG. 33 is a graph illustrating newspaper color saving $\gamma$ added to the other $\gamma$ used by the color material saving process part 16 according to an embodiment of the present invention. By using the newspaper color saving $\gamma$, blank areas of a newspaper can be converted to white and allow color material to be saved.

Accordingly, the newspaper color saving $\gamma$ can be applied when the document type is a (8) newspaper document whereas the character color saving $\gamma$ can be applied to a (7) low line-screen ruling document. Alternatively, the newspaper color saving $\gamma$ can be applied when the document type is either a (8) newspaper document or a (7) low line-screen ruling document taking into consideration that the user may select <0> automatic or <1> character/photograph from the control panel 23 when copying (scanning) a newspaper document.

Hence, with the image processing apparatus 1000 of the fourth embodiment, the color of paper can be converted to white in a case where the document type is a newspaper document. This is advantageous from both the aspect of image quality and the aspect of saving color material.

Although the image processing apparatus 1000 of the above-described first-fourth embodiments describe the color material saving process part 16 performing a color material saving process by applying $\gamma$, other color material saving processes (e.g., pixel skipping) may be used as long as the first color material saving process is performed for enhancing edges of an image whereas the second color material saving process is performed for uniformly reducing the amount of color material applied to an entire image.

Further, although the above-described first-fourth embodiments are described with an image processing apparatus 1000 that obtains image data from a scanner, the image processing apparatus 1000 may obtain data by using other methods (e.g., obtaining PDL data).

Further, the various processes including the color material saving process performed by the above-described first-fourth embodiments of the image processing apparatus 1000 may be realized in the form of an image processing method or in the form of the computer-readable recording medium 500 (e.g., CD-ROM, flash memory) for causing a computer to perform the various processes.

The present invention is not limited to the specifically disclosed embodiments, and variations and modifications may be made without departing from the scope of the present invention.

The present application is based on Japanese Priority Application No. 2008-040810 filed on Feb. 22, 2008, with the Japanese Patent Office, the entire contents of which are hereby incorporated herein by reference.

What is claimed is:

1. An apparatus including an obtaining part for obtaining image data of an original image and a processing part for performing a color material saving process on the image data, the image data including an edge part and a non-edge part, comprising:
    a determining part configured to determine a type of the original image based on determining whether the original image includes a low line-screen ruling area; and
    a filter including an edge enhancing part that performs an edge enhancing process and a smoothing part that performs a smoothing process;
    wherein the processing part is configured to perform either a first process or a second process based on at least a determination of whether the original image includes the low line-screen ruling area,
    when the determining part determines that the low lines screen ruling area is not present, the processing part is configured to perform the first process so that an amount of color material to be reduced for forming a non-edge part is greater than an amount of color material to be reduced for forming an edge part,
    when the determining part determines that the low-line screen ruling area is present, the processing part is configured to perform the second process so that the amount of color material to be reduced for forming the edge part and the amount of color material to be reduced for forming the non-edge part are uniform;
    wherein in the second process, the filter is configured to composite results of the edge enhancing process and the smoothing process according to a fixed ratio in the second process in a case where the original image includes the low line-screen area.

2. The apparatus as claimed in claim 1, wherein the determining part is configured to determine whether the original image only includes a character area,
    wherein when the original image is determined to only include the character area, the processing part is configured to perform a third process so that the amounts of color material reduced for forming the edge part and the non-edge parts are uniform, wherein the uniformly reduced amount of color material is less than the amount of color material reduced for forming the non-edge part in the first process.

3. The apparatus as claimed in claim 1, wherein the determining part is configured to determine whether the original image includes a photograph area,
    wherein when the original image is determined to include the low line-screen ruling area but not include the photograph area, the processing part is configured to perform the first process instead of the second process.

4. The apparatus as claimed in claim 1, wherein the determining part is configured to determine whether the original image includes a newspaper area, wherein when the original image is determined to include the newspaper area, the processing part is configured to perform the second process.

5. The apparatus as claimed in claim 4, wherein the determining part is configured to determine whether the original image includes a photograph area,
    wherein when the original image is determined to include the newspaper area but not include the photograph area, the processing part is configured to perform the first process instead of the second process.

6. The apparatus as claimed in claim 1, wherein the determining part is configured to determine whether the original image only includes a photograph area, wherein when the original image is determined to only include the photograph area and not include the low line-screen ruling area, the processing part is configured to perform the second process instead of the first process.

7. The apparatus as claimed in claim 1, further comprising:
    a preliminary processing part configured to preliminarily perform the first process regardless of the type of the original image; and
    a gradation inversion determining part configured to determine whether a gradation inversion would occur if the preliminary processing part performs the first process;
    wherein when the gradation inversion is determined to occur, the processing part is configured to perform the second process.

8. The apparatus as claimed in claim 1, wherein the processing part is configured to convert a low density part of the image data to a white color in the second process.

9. The apparatus as claimed in claim 1, wherein the processing part is configured to perform the first process when the original image is determined not to include the low line-screen ruling area, wherein the processing part is configured to perform the second process when the original image is determined to include the low line-screen ruling area.

10. A method for obtaining image data of an original image and performing a color material saving process on the image data, the image data including an edge part and a non-edge part, comprising the steps of:
    a) determining a type of the original image by a processor based on determining whether the original image includes a low line-screen ruling area;
    performing an edge enhancing process and a smoothing process; and
    b) performing either a first process or a second process by the processor based on at least a determination of whether the original image includes the low line-screen ruling area;
    wherein the first process is performed so that an amount of color material to be reduced for forming a non-edge part is greater than an amount of color material to be reduced for forming an edge part,
    wherein the second process is performed so that the amount of color material to be reduced for forming the edge part and the amount of color material to be reduced for forming the non-edge part are uniform;
    wherein in the second process, results of the edge enhancing process and the smoothing process are composited according to a fixed ratio in a case where the original image includes the low line-screen area.

11. A non-transitory computer-readable medium on which a program is recorded for causing a computer to execute an image processing method for obtaining image data of an original image and performing a color material saving process on the image data, the image processing method comprising the steps of:

a) determining a type of the original image based on determining whether the original image includes a low line-screen ruling area;

performing an edge enhancing process and a smoothing process;

b) performing either a first process or a second process based on at least a determination of whether the original image includes the low line-screen ruling area;

wherein the first process is performed so that an amount of color material to be reduced for forming a non-edge part is greater than an amount of color material to be reduced for forming an edge part, wherein the second process is performed so that the amount of color material to be reduced for forming the edge part and the amount of color material to be reduced for forming the non-edge part are uniform;

wherein in the second process, results of the edge enhancing process and the smoothing process are composited according to a fixed ratio in a case where the original image includes the low line-screen area.

* * * * *